United States Patent
Hagiwara

(10) Patent No.: US 8,228,616 B2
(45) Date of Patent: Jul. 24, 2012

(54) ZOOM LENS AND IMAGE PICKUP APPARATUS HAVING THE SAME

(75) Inventor: Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/896,751

(22) Filed: Oct. 1, 2010

(65) Prior Publication Data
US 2011/0085250 A1  Apr. 14, 2011

(30) Foreign Application Priority Data
Oct. 14, 2009  (JP) .................................. 2009-237482

(51) Int. Cl.
*G02B 15/14* (2006.01)

(52) U.S. Cl. ....................................................... 359/687
(58) Field of Classification Search ................... 359/687
See application file for complete search history.

(56) References Cited

U.S. PATENT DOCUMENTS

| | | | |
|---|---|---|---|
| 5,963,378 A | 10/1999 | Tochigi et al. | |
| 6,166,864 A | 12/2000 | Horiuchi | |
| 7,193,787 B2 | 3/2007 | Horiuchi | |
| 7,212,350 B2 * | 5/2007 | Ori | ............................ 359/687 |
| 7,466,496 B2 | 12/2008 | Hoshi | |
| 2008/0043344 A1 | 2/2008 | Ohtake | |

\* cited by examiner

*Primary Examiner* — Joseph P Martinez
(74) *Attorney, Agent, or Firm* — Canon U.S.A., Inc. IP Division

(57) ABSTRACT

A zoom lens includes, from the object side to the image side, a first lens group having positive refractive power, a second lens group having negative refractive power, a third lens group having positive refractive power, and a fourth lens group having positive refractive power. At least the second and fourth lens groups are moved along the optical axis during zooming. The second lens group includes, from the object side to the image side, three negative lenses and one positive lens and satisfies $0.54<|f2|/\sqrt{(fw \cdot ft)}<0.66$ where $f2$ is the focal length of the second lens group, and $fw$ and $ft$ are the focal lengths of the entire optical system at the wide-angle end and at the telephoto end, respectively.

5 Claims, 33 Drawing Sheets

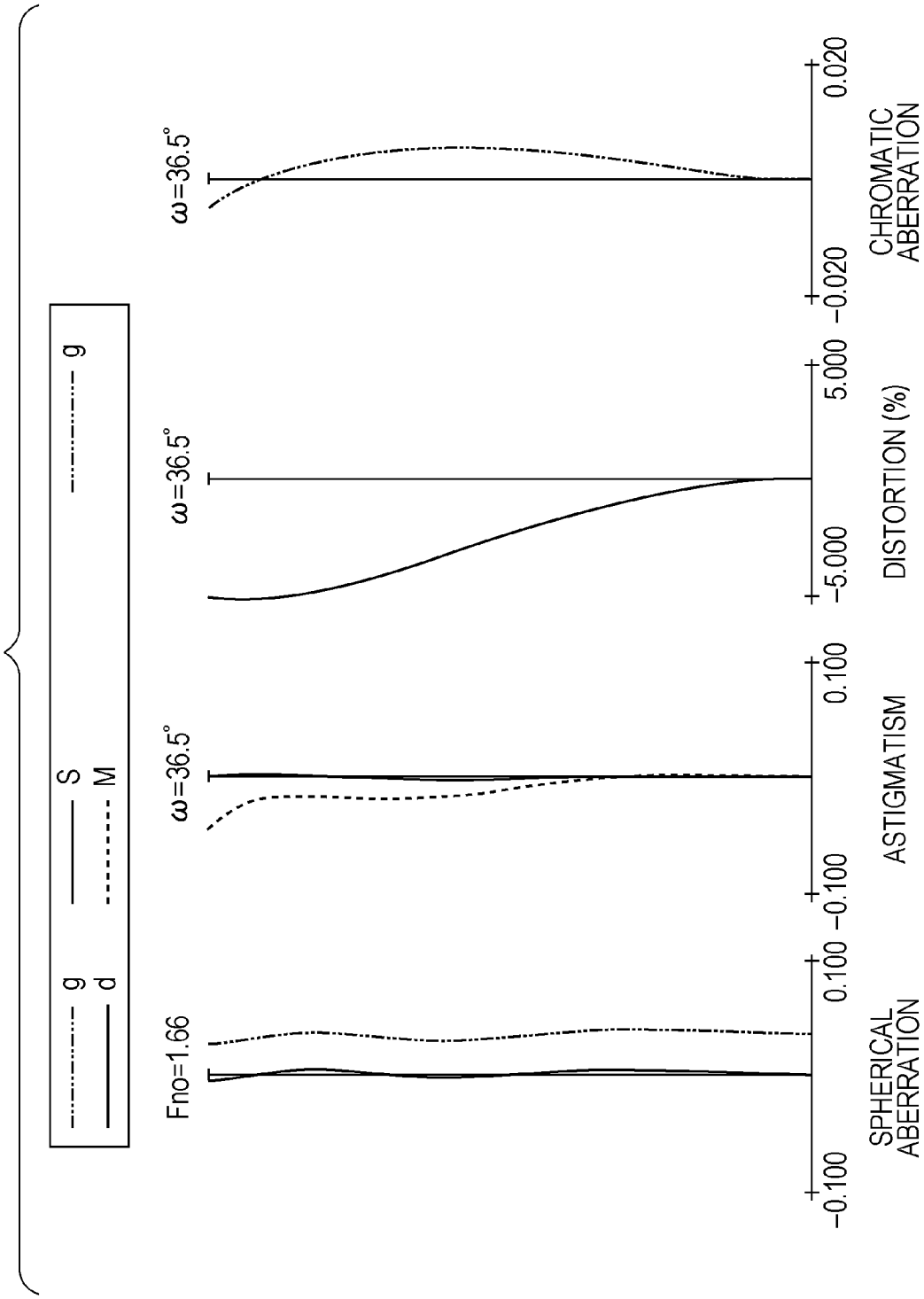

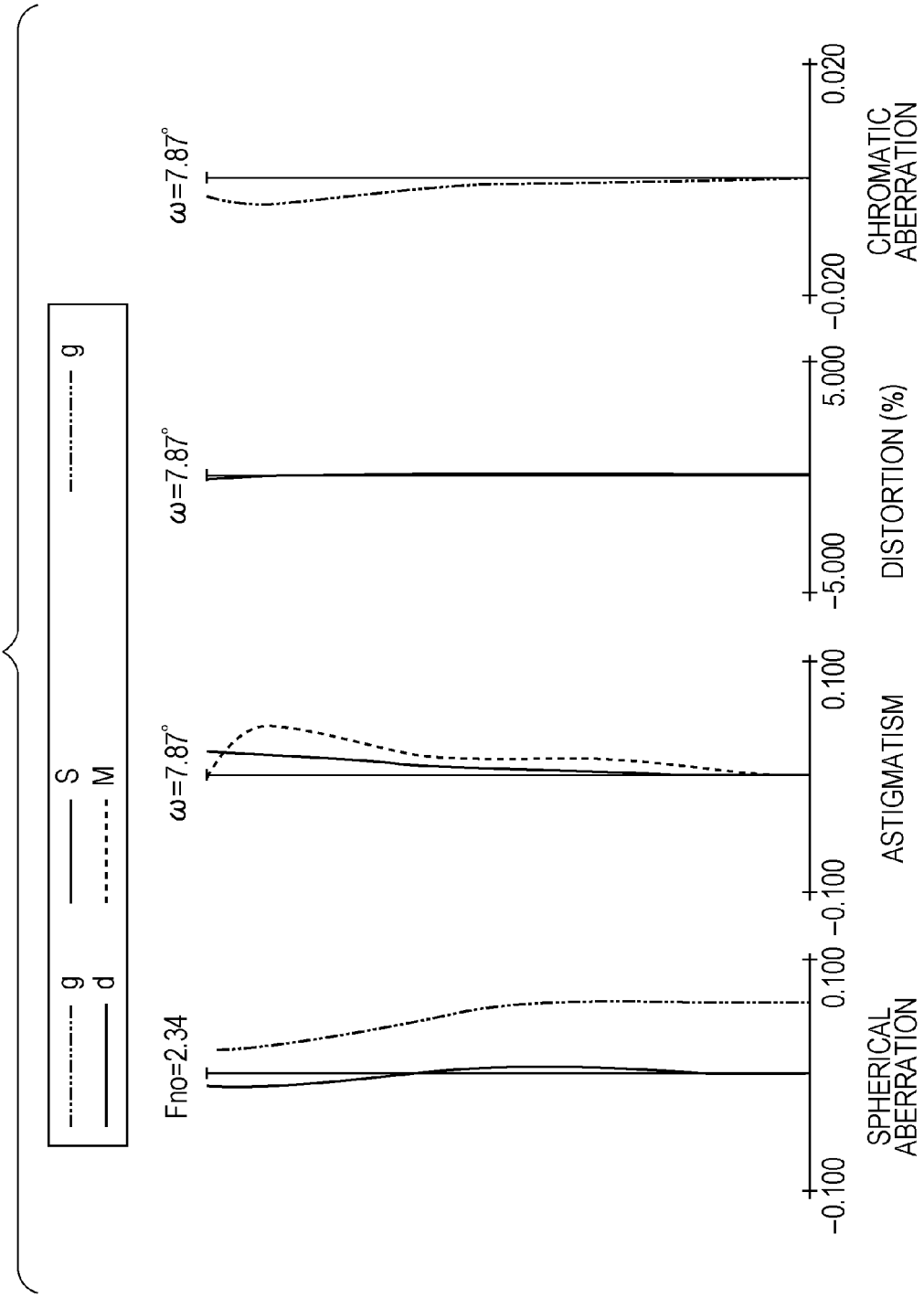

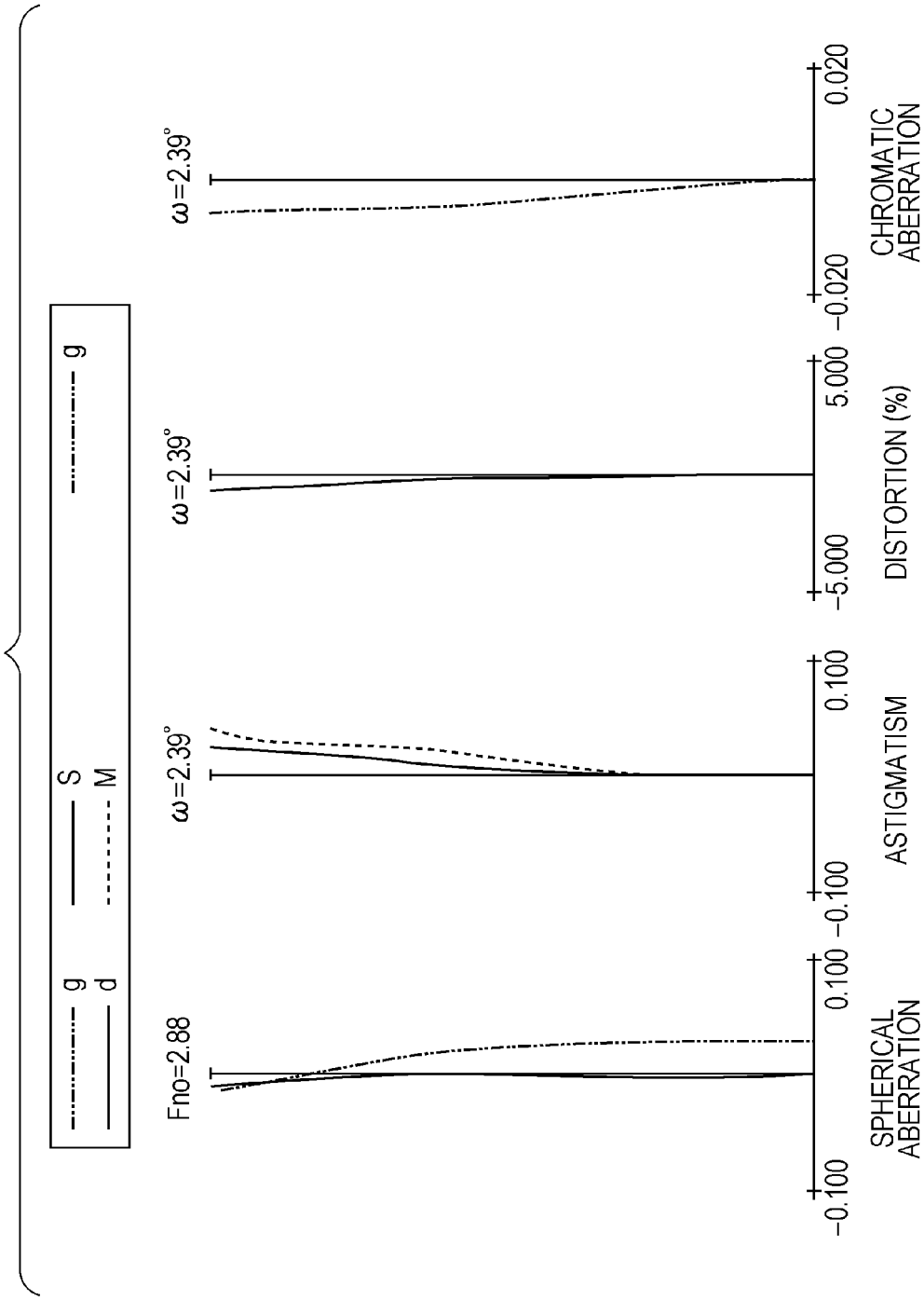

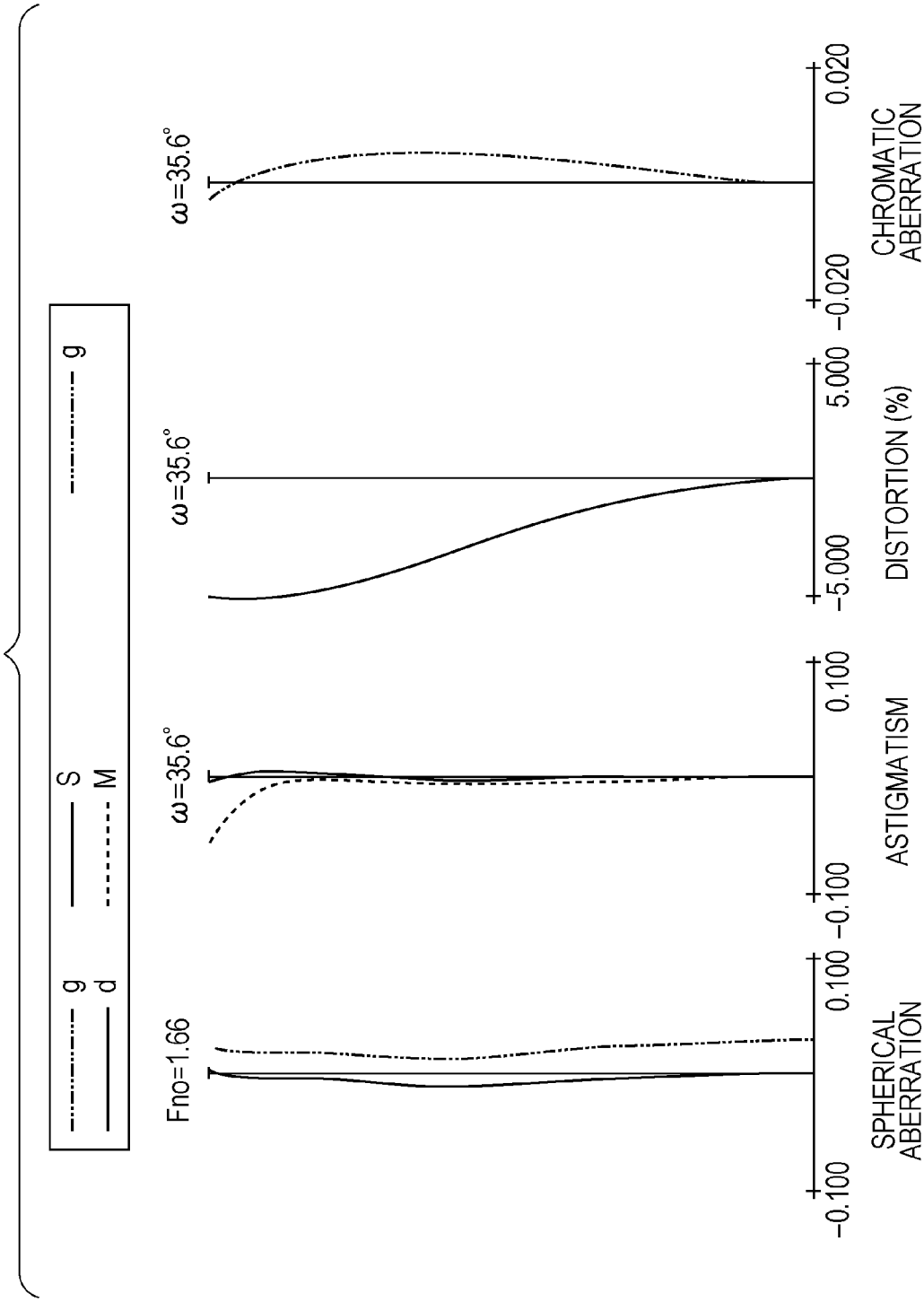

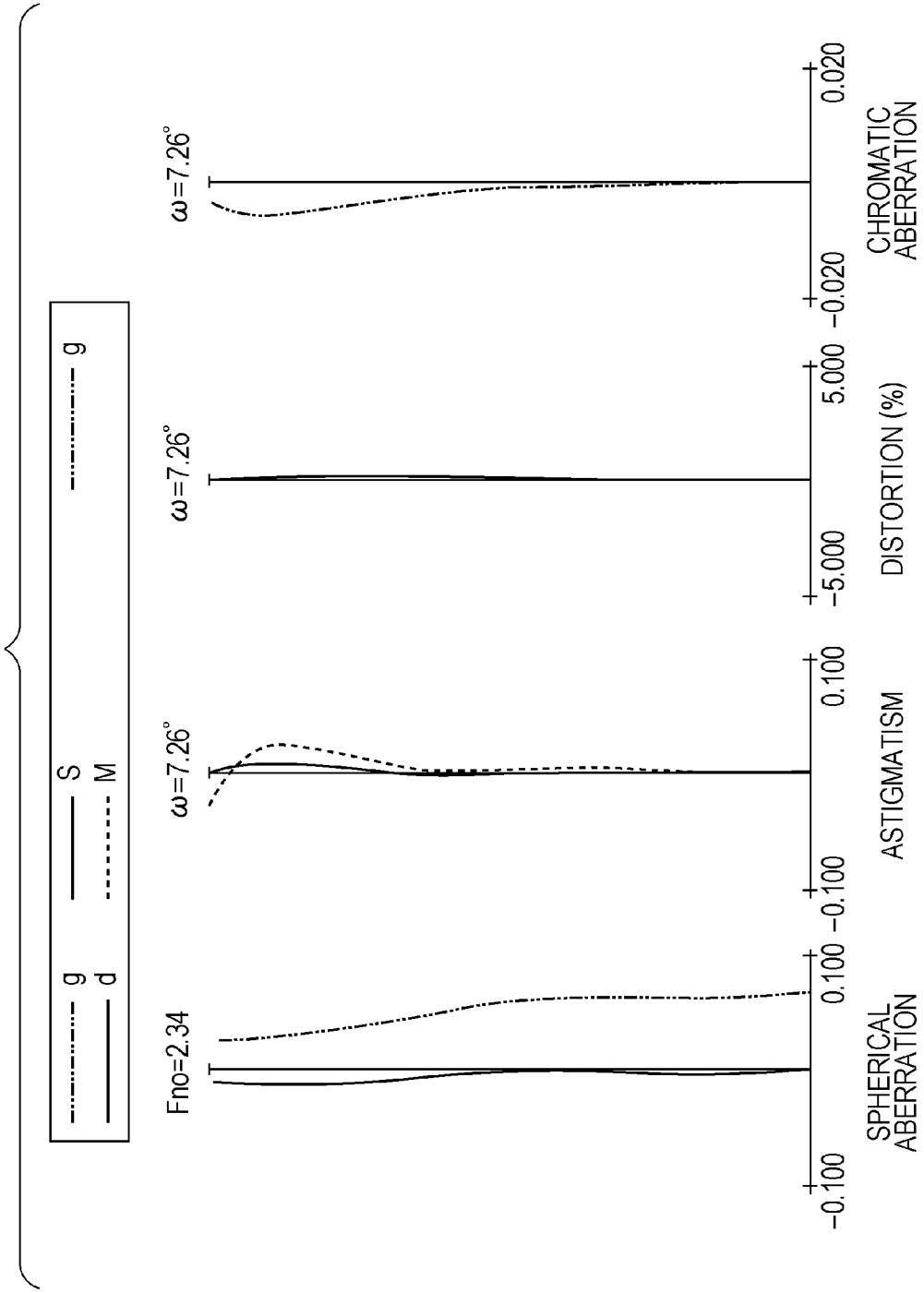

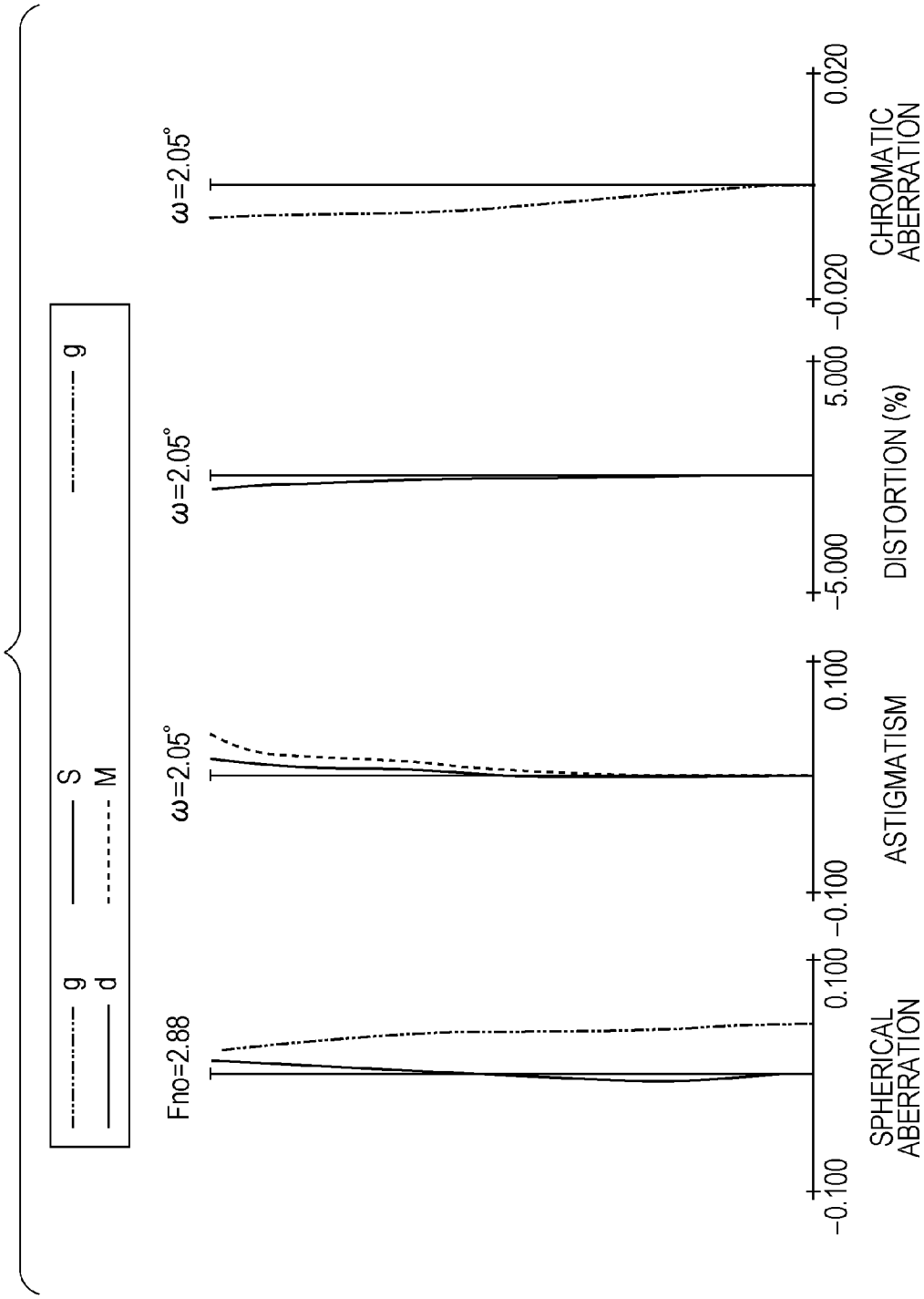

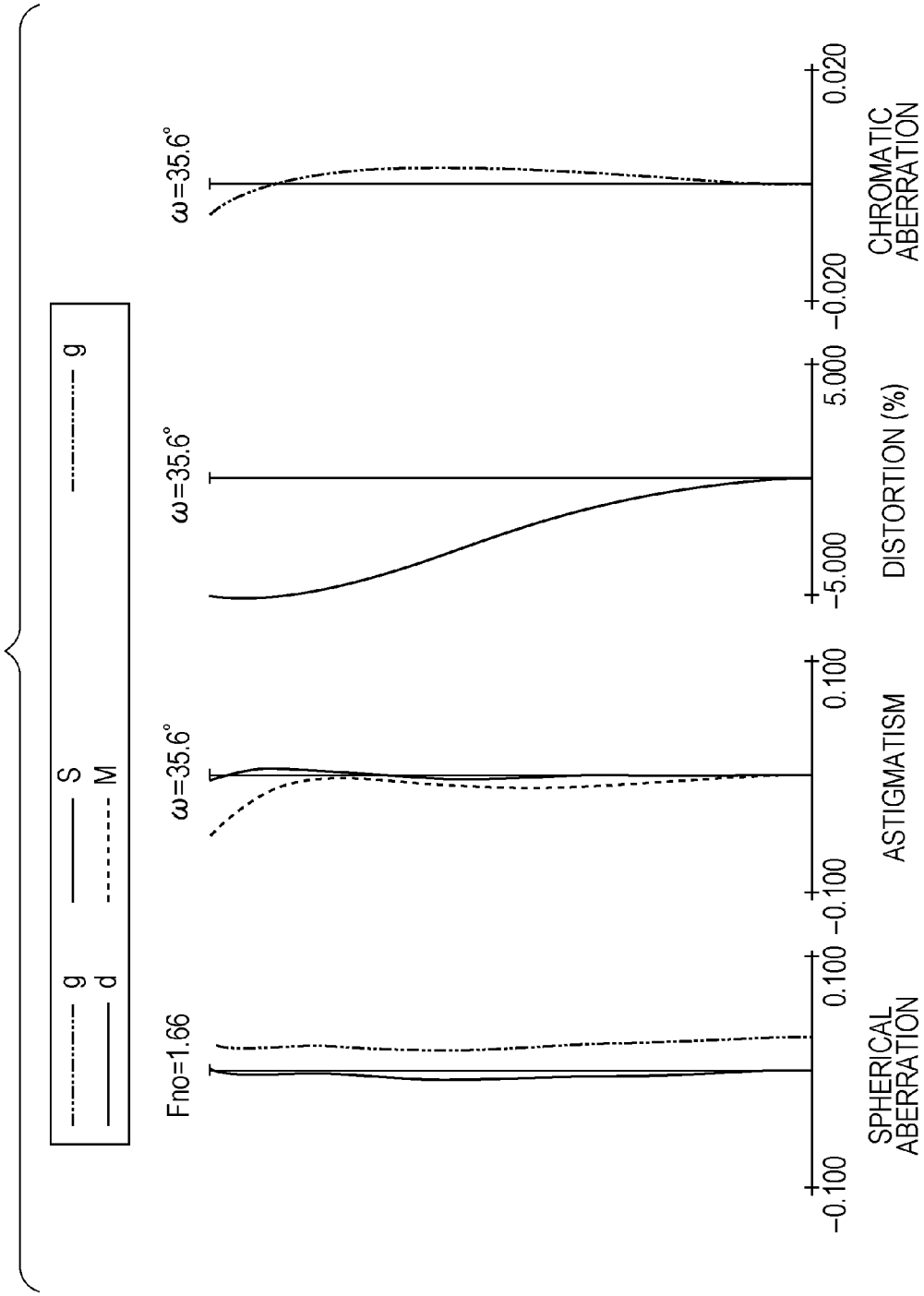

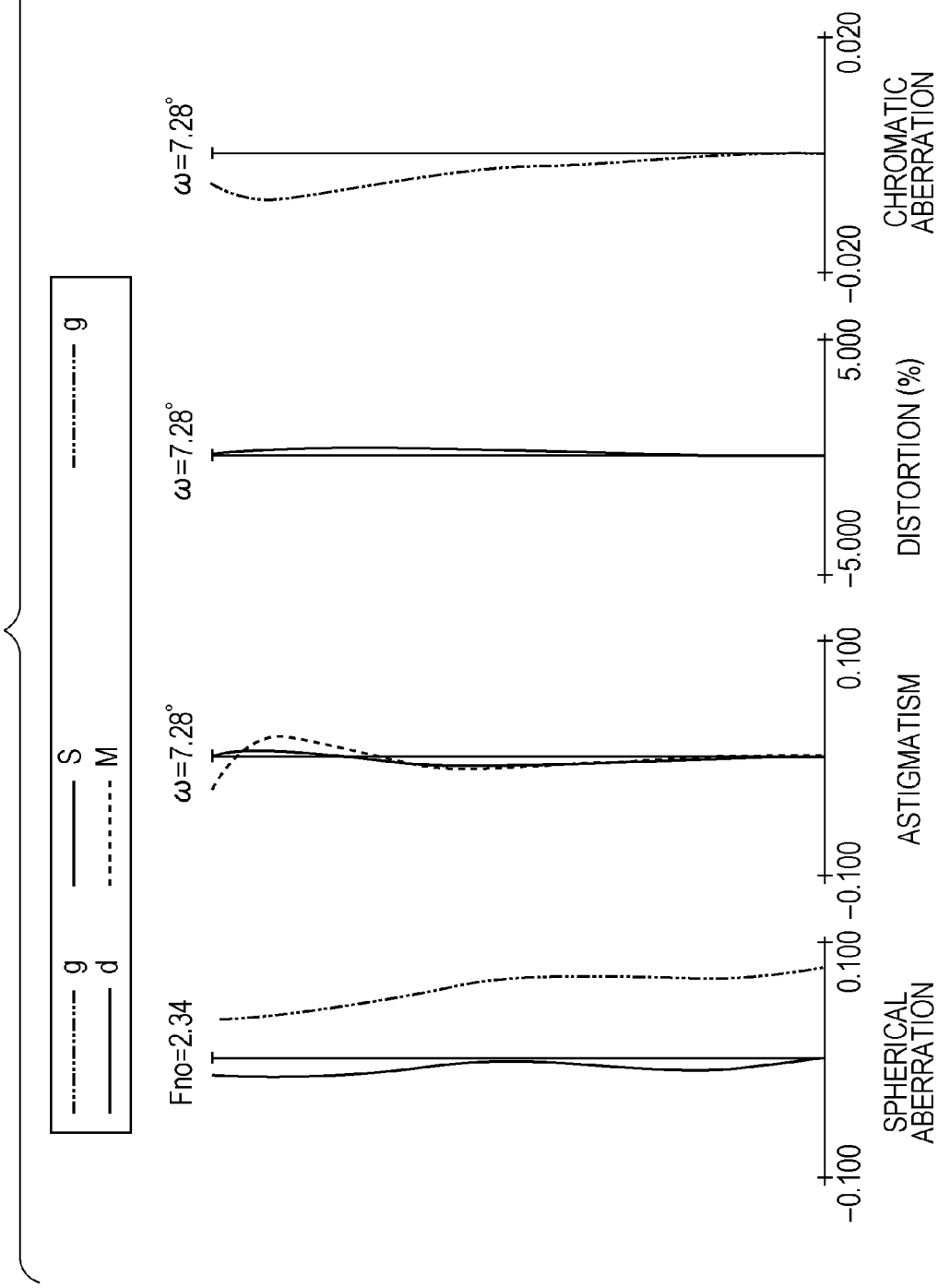

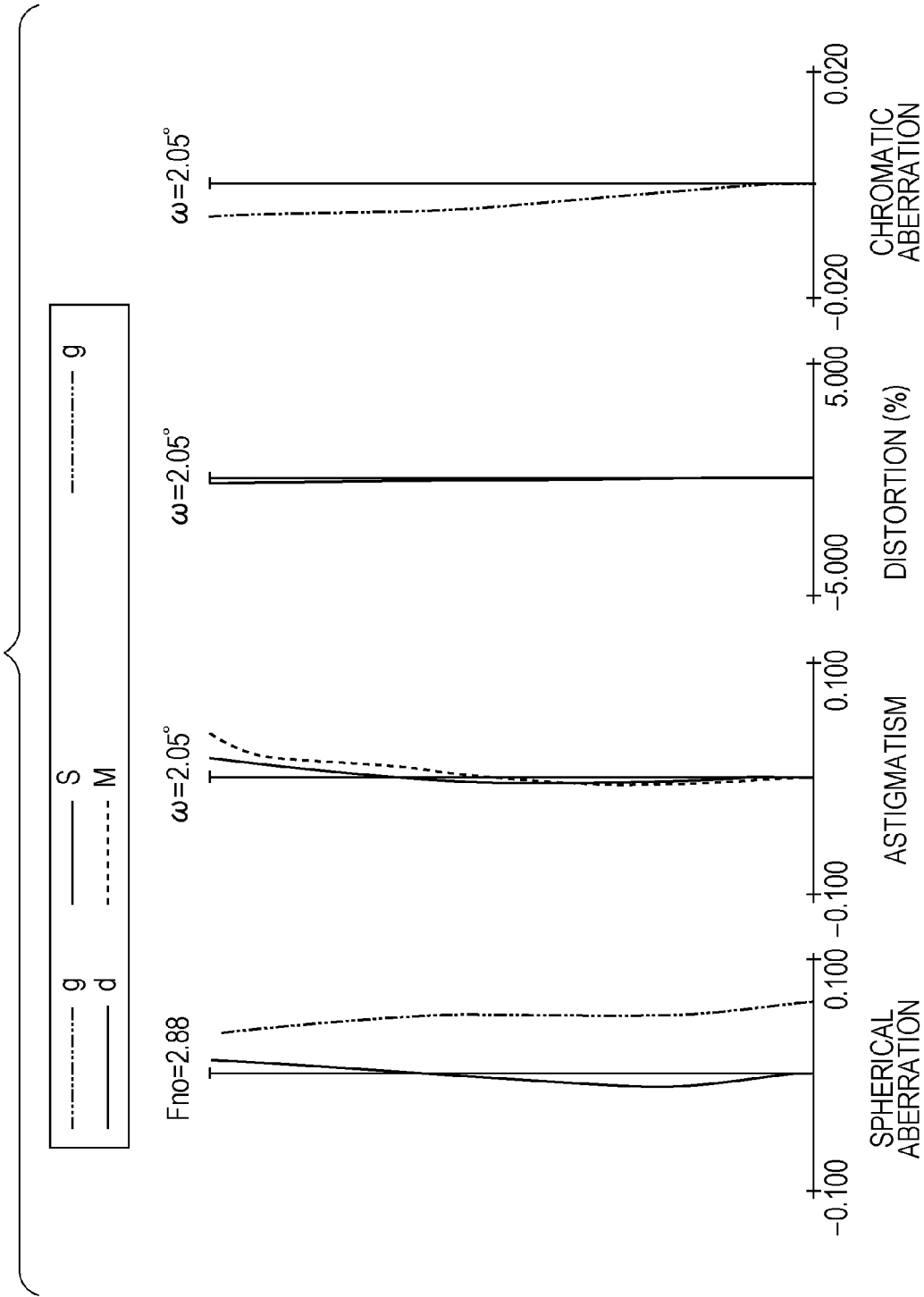

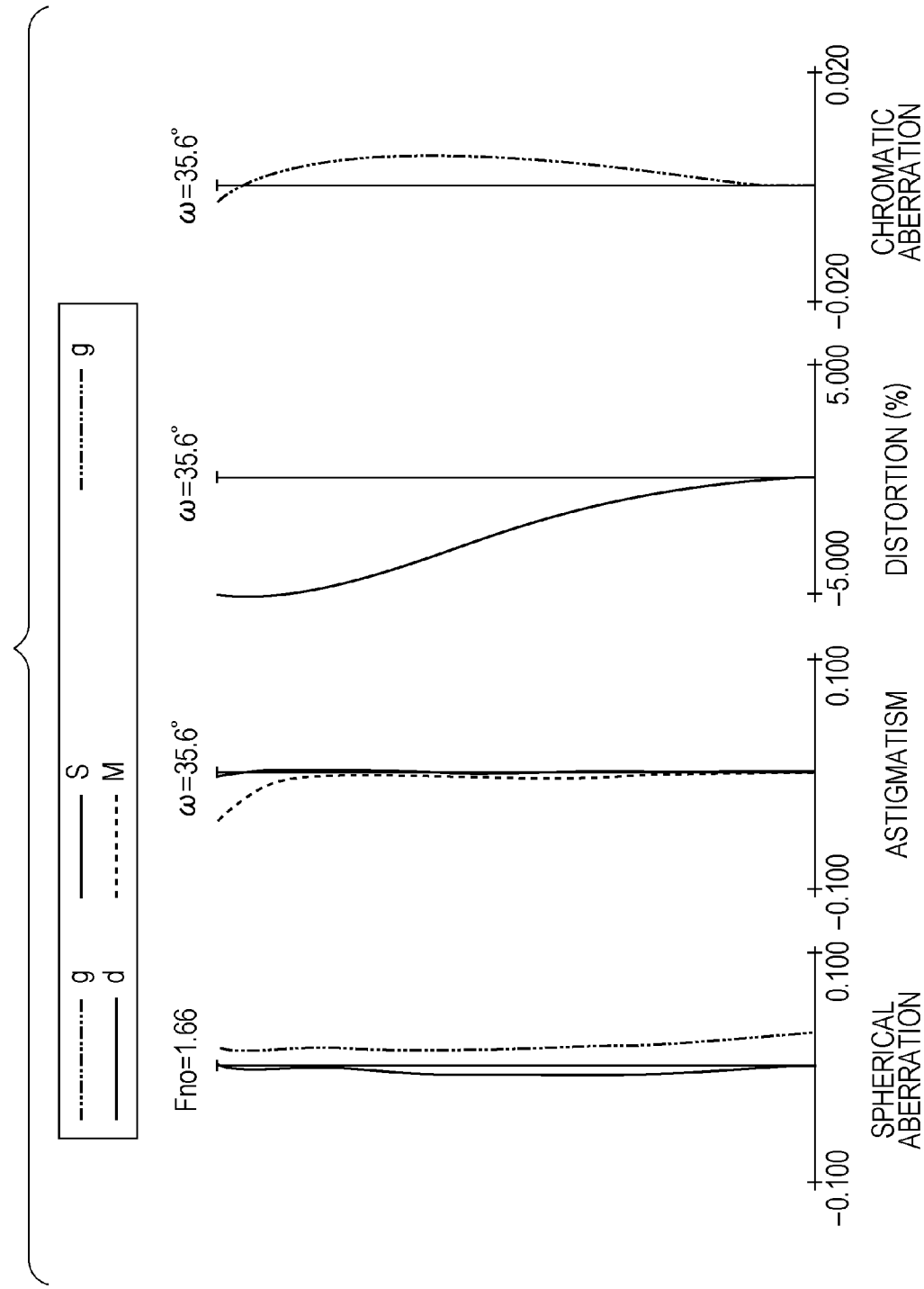

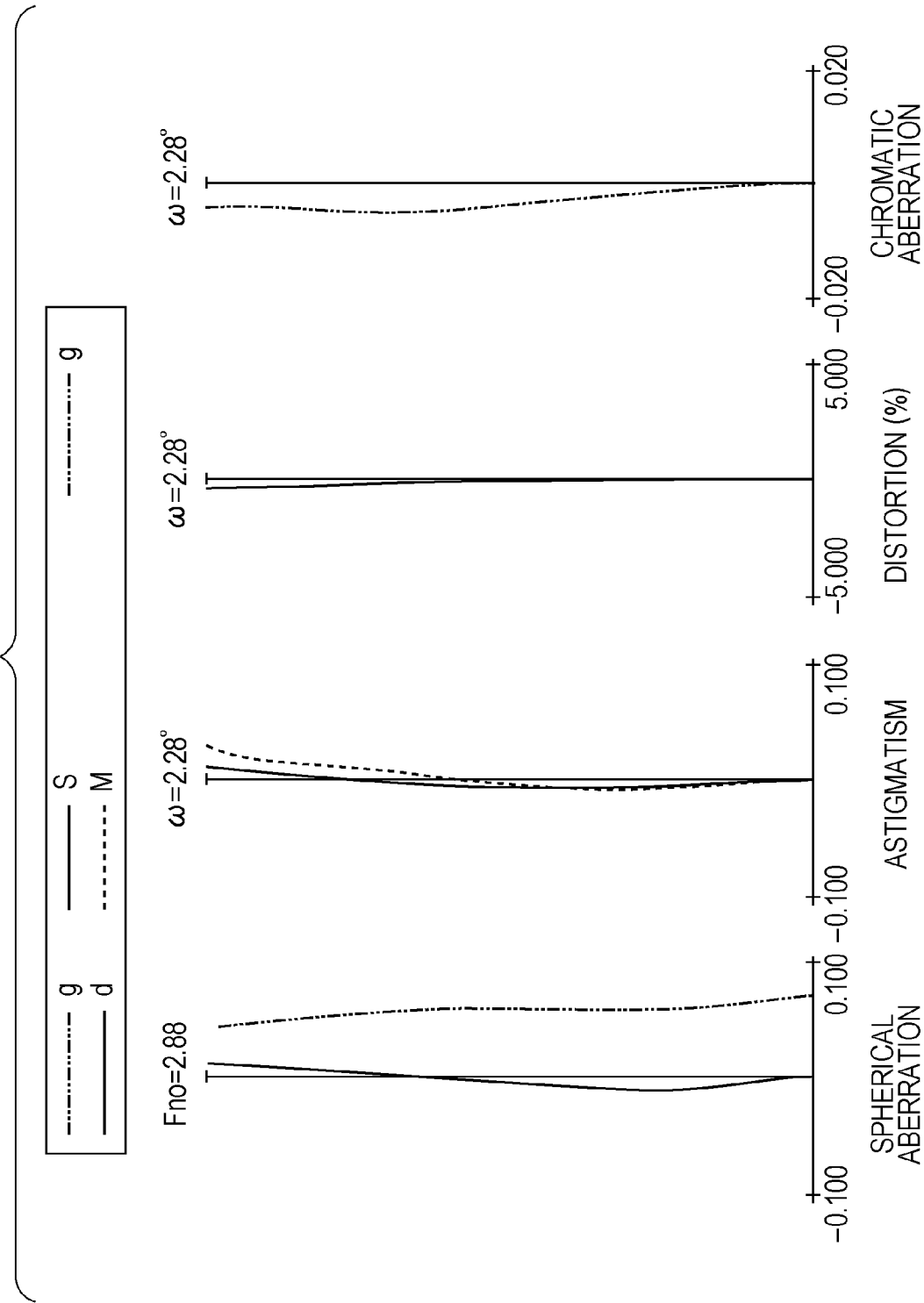

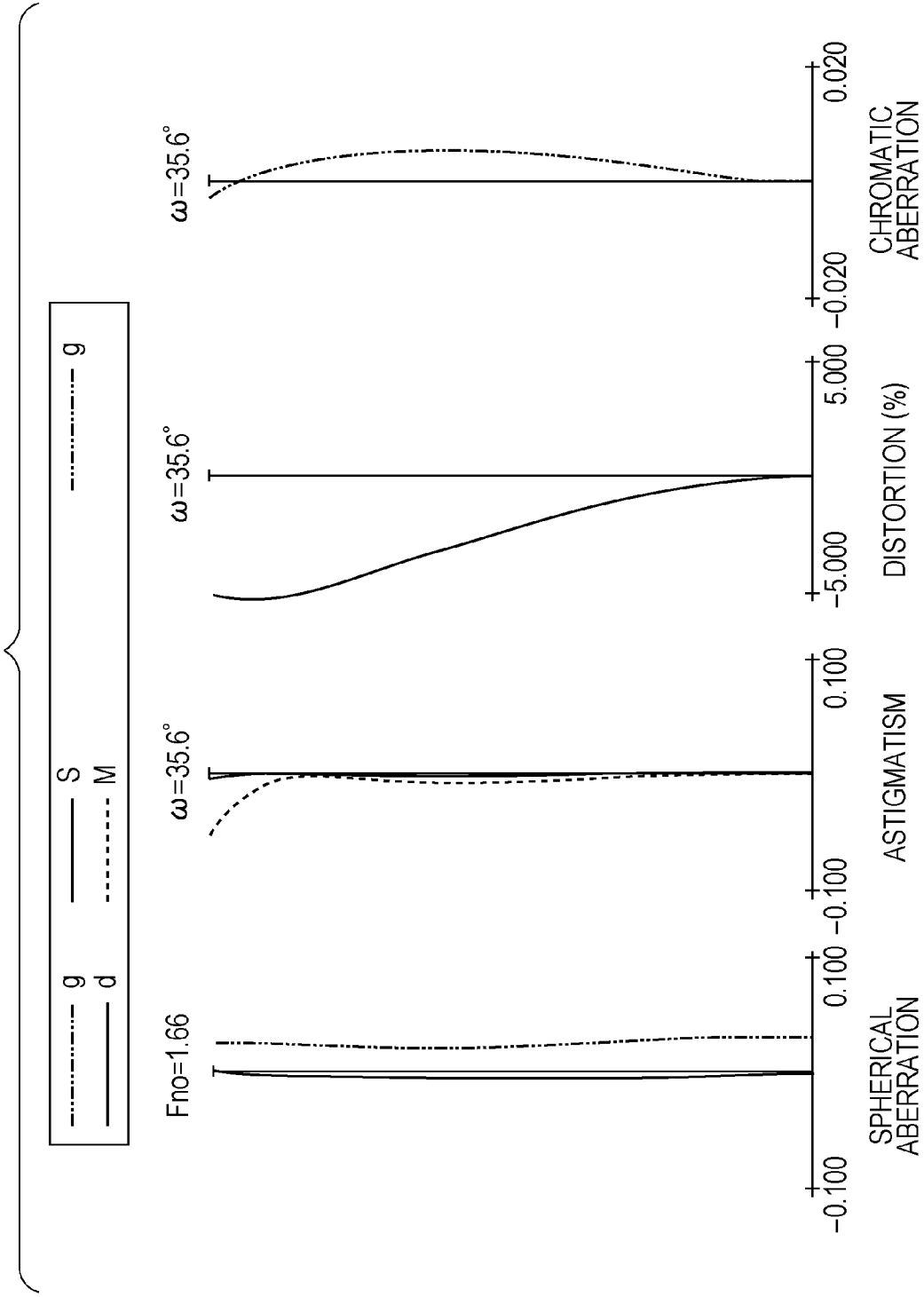

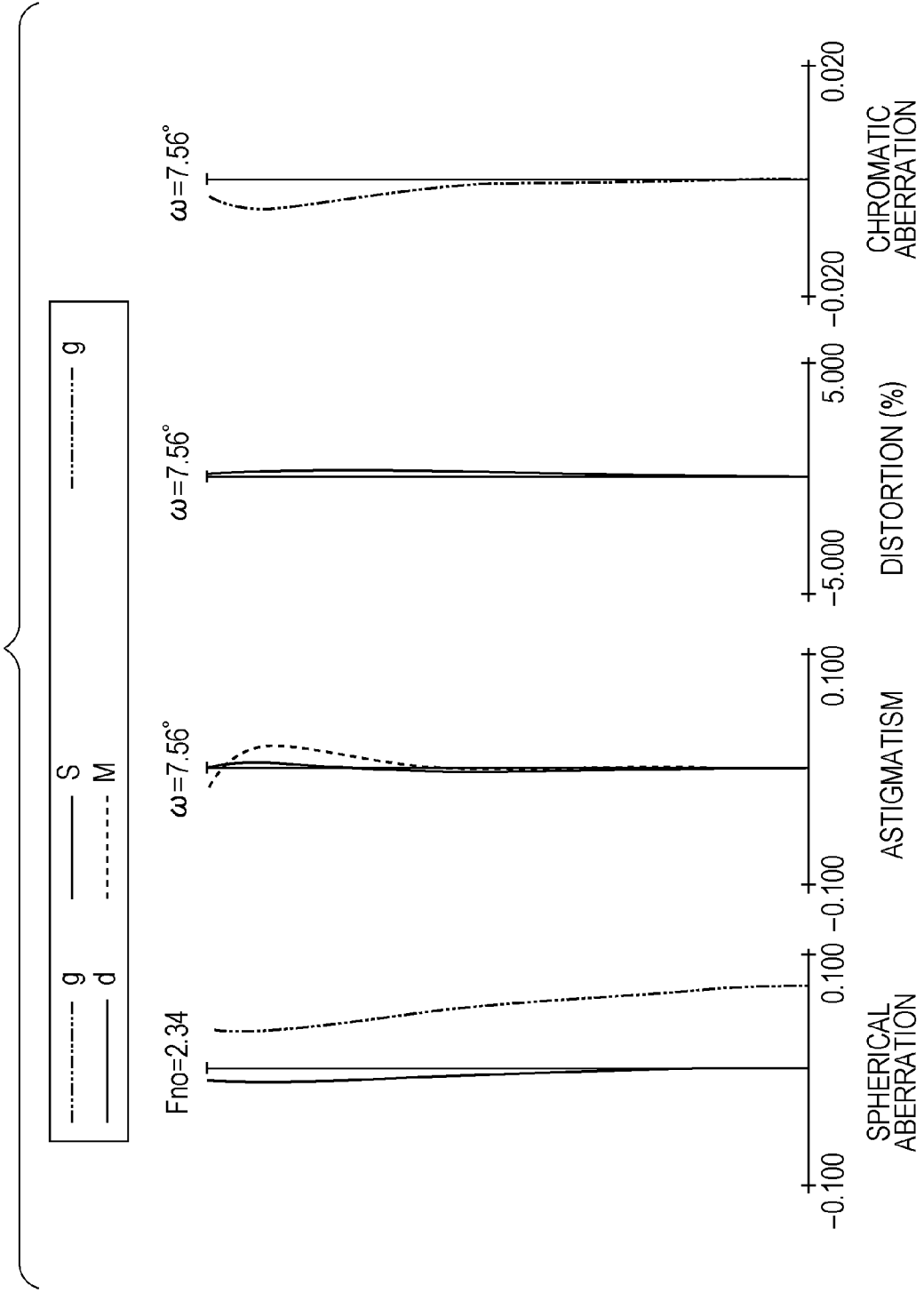

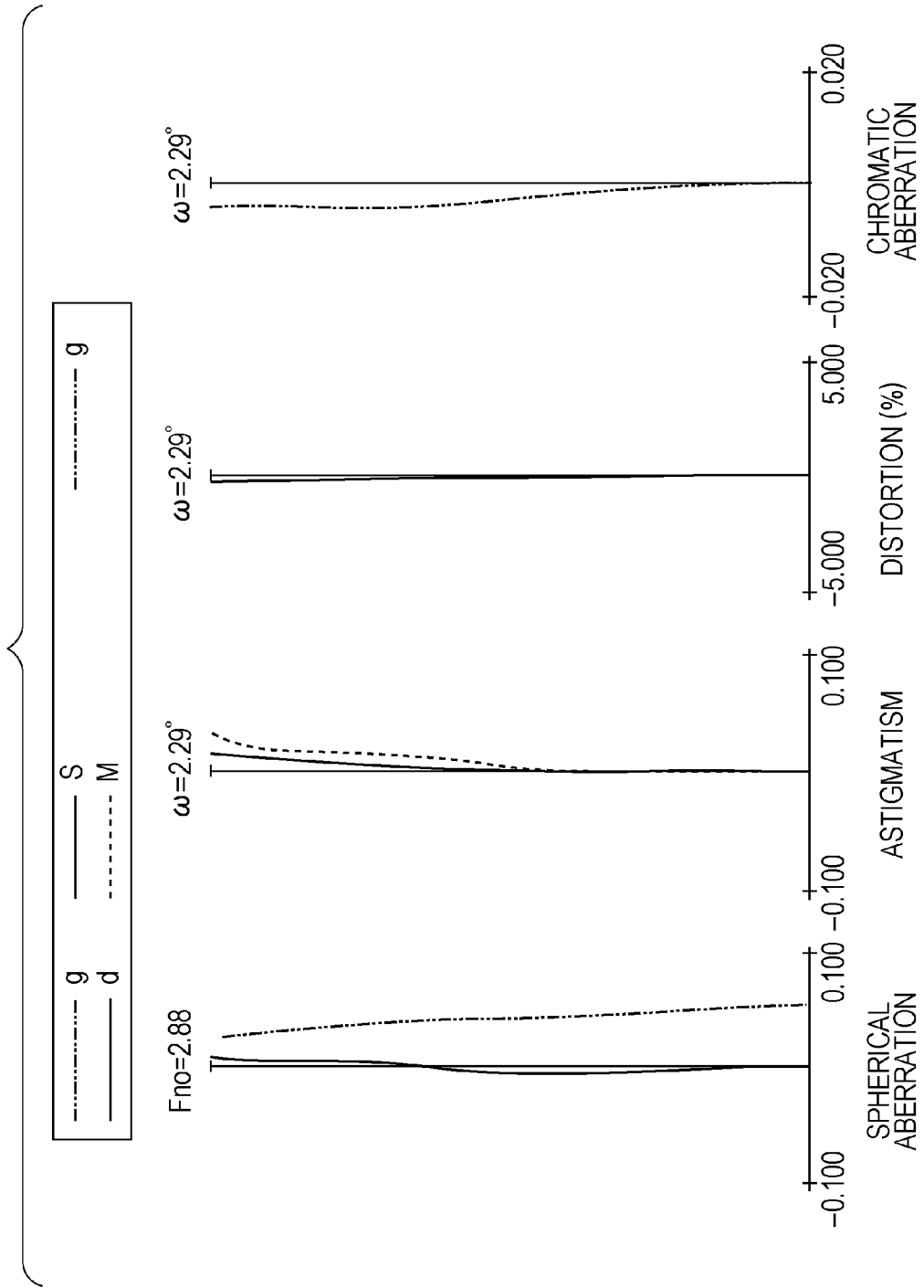

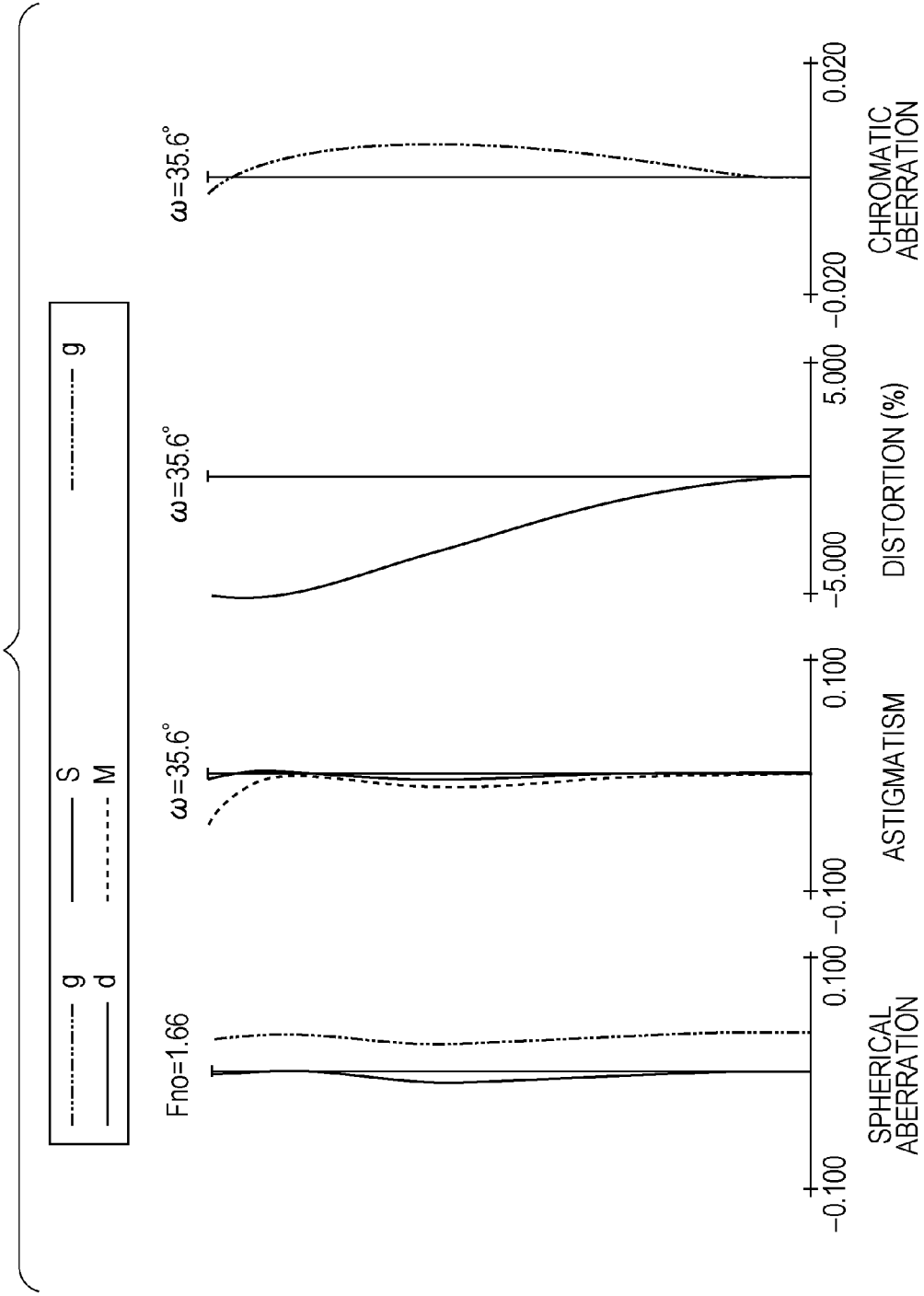

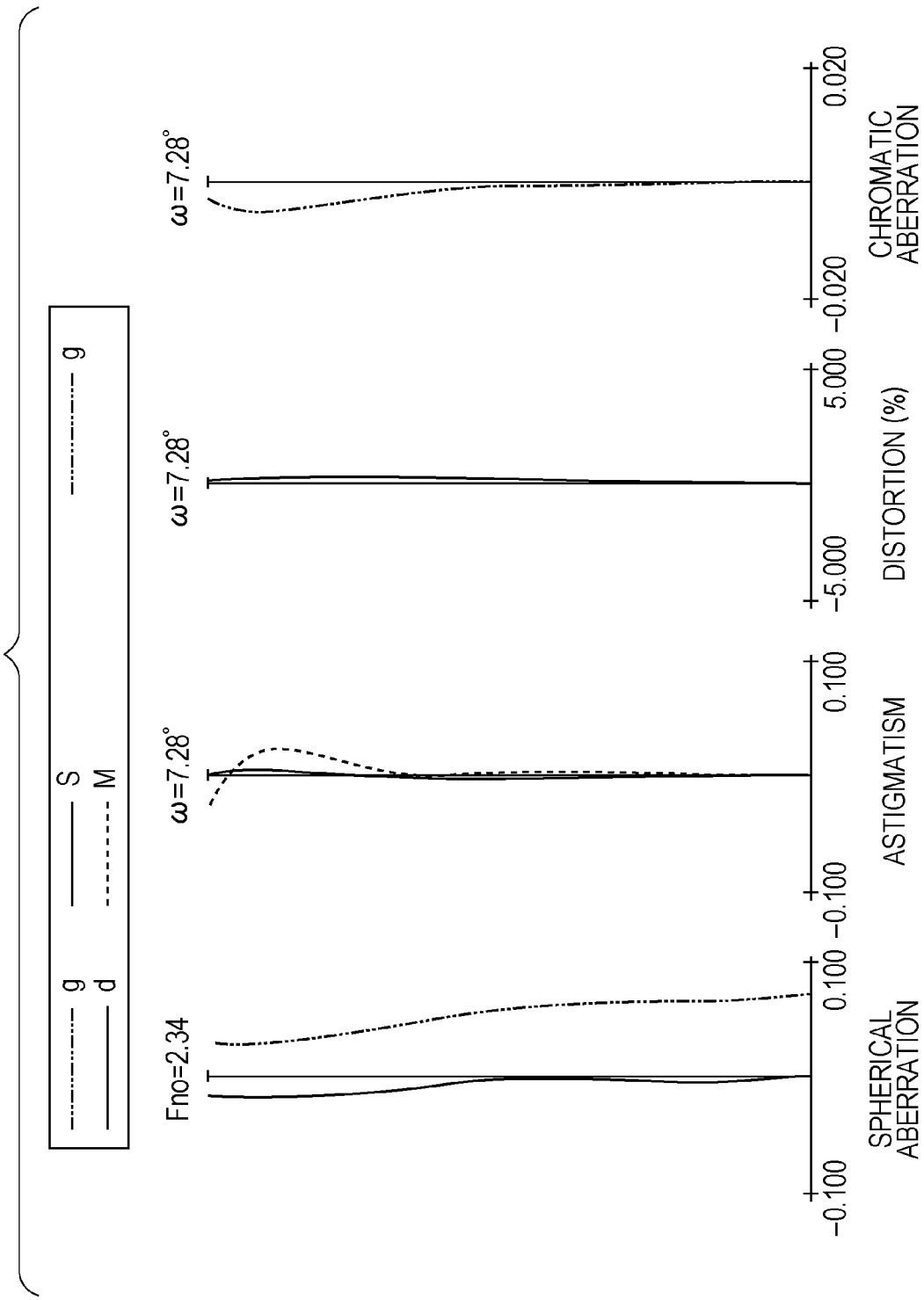

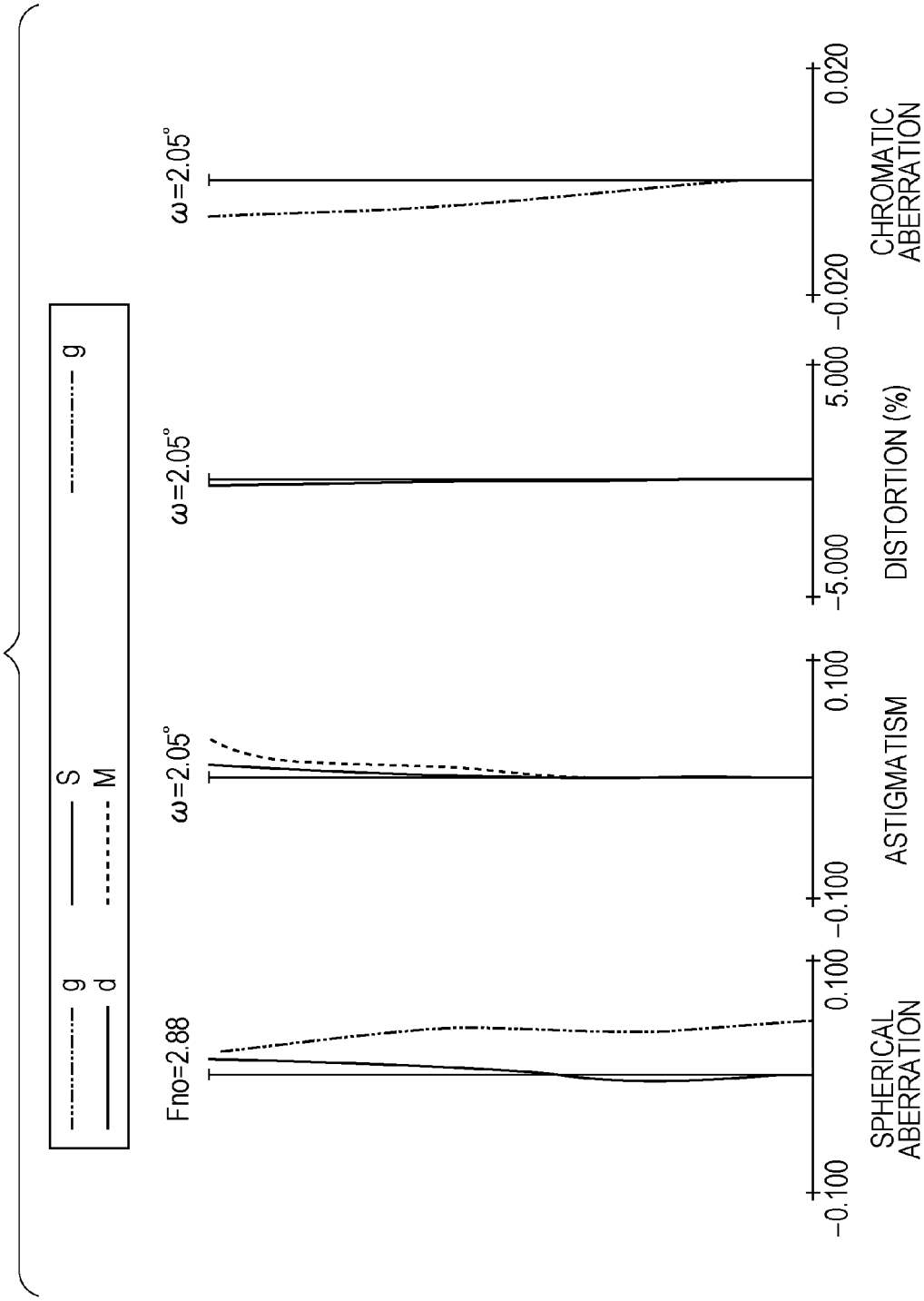

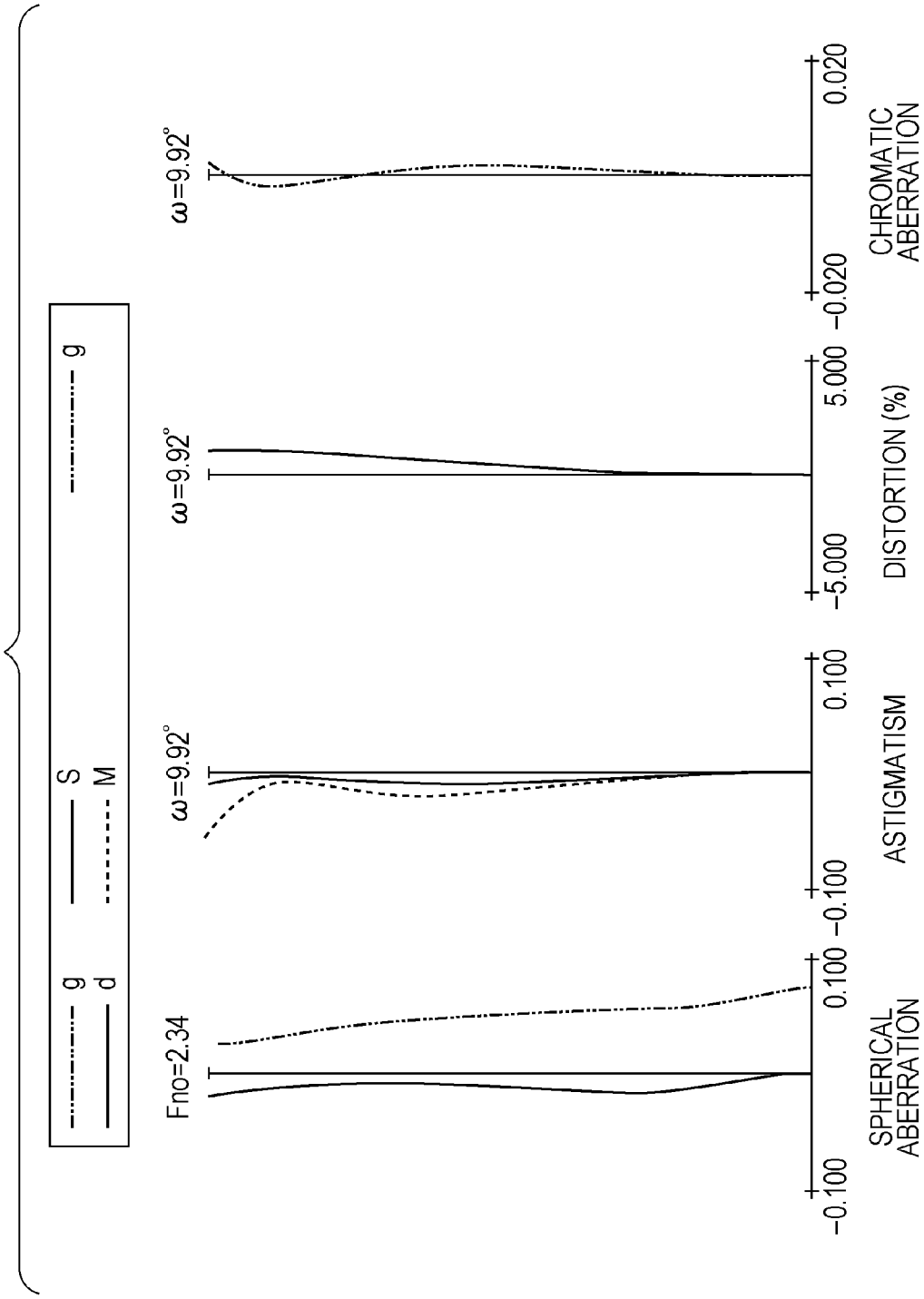

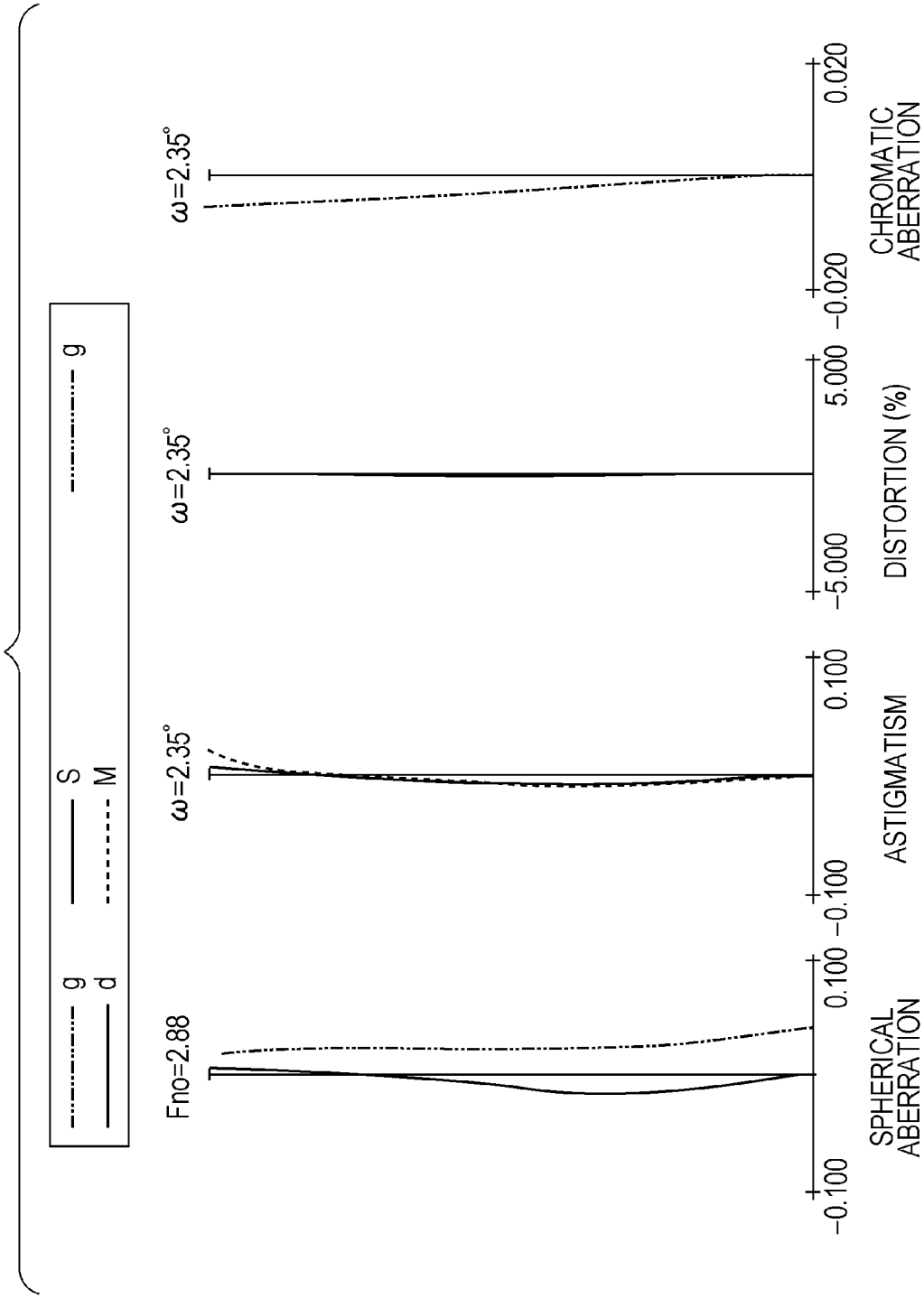

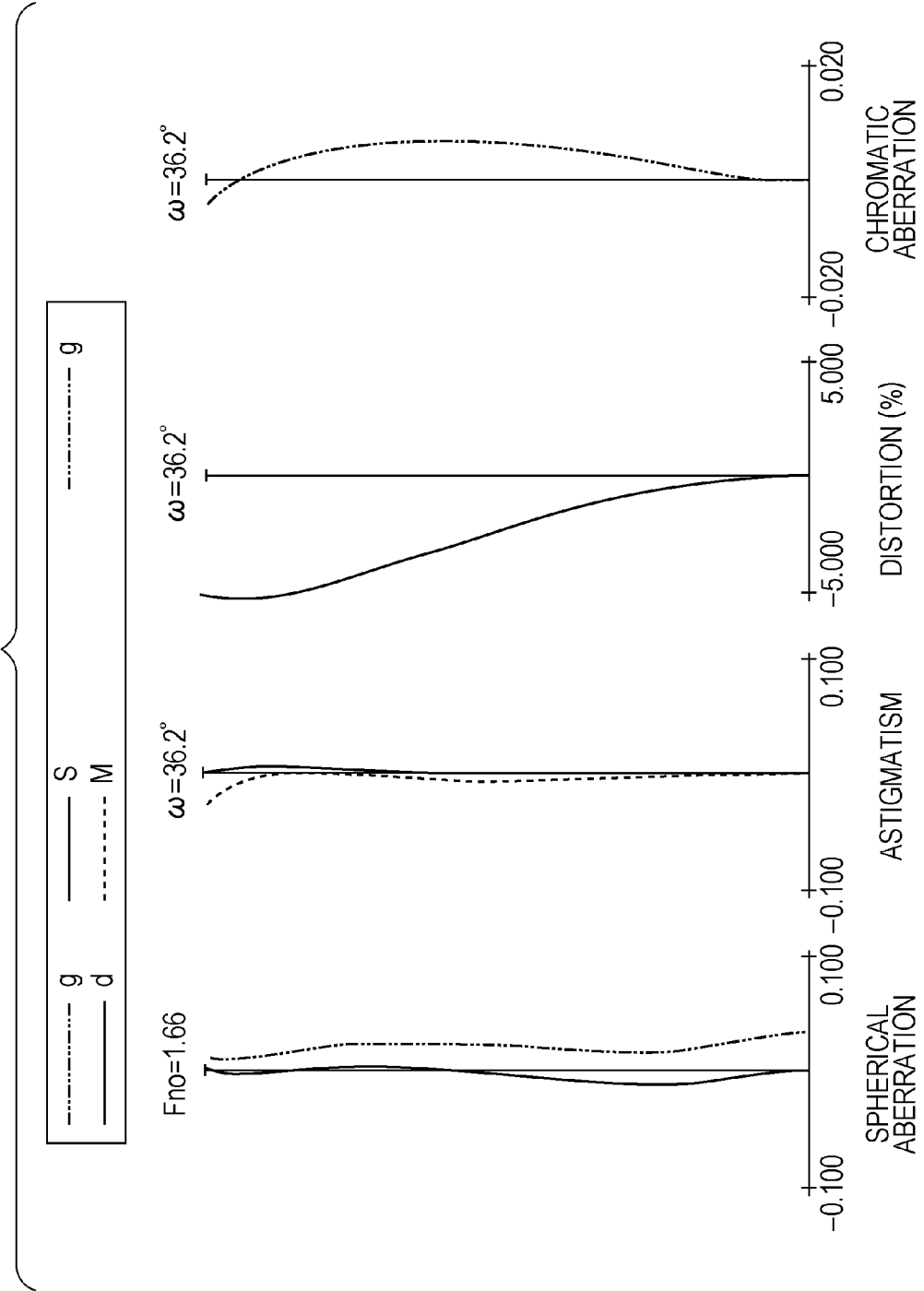

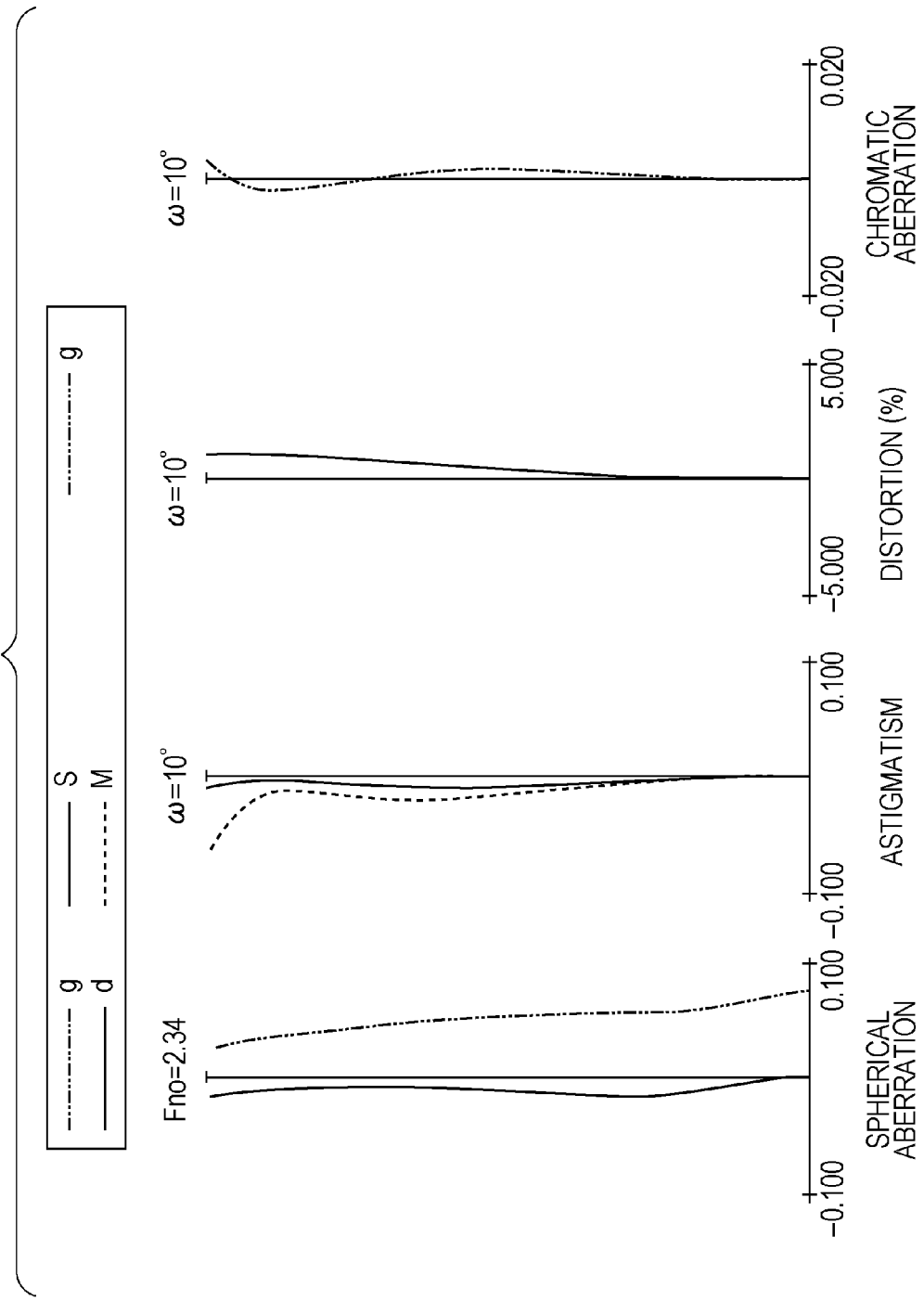

ZOOM LENS AND IMAGE PICKUP APPARATUS HAVING THE SAME

BACKGROUND OF THE INVENTION

1. Field of the Invention

The present invention relates to zoom lenses and image pickup apparatuses having the same, and more in particular to zoom lenses suitable for use in image pickup apparatuses, such as video cameras, silver-halide film cameras, digital cameras, television cameras, and surveillance cameras.

2. Description of the Related Art

In recent years, imaging optical systems for image pickup apparatuses such as video cameras and digital still cameras are required to have a wide field angle, a high zoom ratio, and high optical performance over the entire zoom range. To meet such requirements, a zoom lens composed of four groups of lenses including, in order from the object side to the image side, a first lens group having positive refractive power, a second lens group having negative refractive power, a third lens group having positive refractive power, and a fourth lens group having positive refractive power has been proposed. The side of a lens where an object to be imaged is placed is referred to as the object side or front side of the lens; and the side of the lens where the image is formed is referred to as the image side or back side of the lens.

For example, U.S. Pat. Nos.: 5,963,378, 6,166,864, and 7,193,787 disclose rear-focusing type four-group zoom lenses, in which the second lens group is moved to perform zooming, and the fourth lens group performs focusing and is moved to correct image plane variation caused by zooming. Other examples that include U.S. patent application publication No. 2008/0043344 and U.S. Pat. No. 7,466,496 disclose four-group zoom lenses having a high zoom ratio of about 20×.

In general, in order to increase the zoom ratio, the refractive power of a lens group for zooming is increased and the traveling distance for zooming is increased. However, in such a zoom lens, the aberration variation occurring during zooming is large, which makes it difficult for the zoom lens to achieve high optical performance over the entire zoom range.

Therefore, in order to achieve high optical performance over the entire zoom range while increasing the field angle and zoom ratio, it is important to appropriately set the zoom type, the refractive power of each lens group, and the lens configuration of each lens group. In particular, in the above-mentioned rear-focusing type four-group zoom lenses, it is important to appropriately set the configuration of the second lens group, which mainly performs zooming.

SUMMARY OF THE INVENTION

A zoom lens of the present invention includes, in order from the object side to the image side, a first lens group having positive refractive power, a second lens group having negative refractive power, a third lens group having positive refractive power, and a fourth lens group having positive refractive power. The first to fourth lens groups are part of an optical system that forms the zoom lens and are arranged along an optical axis of the optical system. At least the second lens group and the fourth lens group are moved along the optical axis during zooming. The second lens group includes, in order from the object side to the image side, three negative lenses and one positive lens and satisfies $0.54 < |f2|/\sqrt{fw \cdot ft} < 0.66$ where f2 is the focal length of the second lens group, and fw and ft are the focal lengths of the entire optical system at the wide-angle end and at the telephoto end, respectively.

The present invention provides a zoom lens having a wide field angle, a high zoom ratio, and high optical performance over the entire zoom range.

Further features of the present invention will become apparent to persons having ordinary skill in the art from the following description of exemplary embodiments with reference to the attached drawings.

BRIEF DESCRIPTION OF THE DRAWINGS

FIGS. 2A to 2C are aberration diagrams of the zoom lens according to the first embodiment.

FIGS. 4A to 4C are aberration diagrams of the zoom lens according to the second embodiment.

FIGS. 6A to 6C are aberration diagrams of the zoom lens according to the third embodiment.

FIGS. 8A to 8C are aberration diagrams of the zoom lens according to the fourth embodiment.

FIGS. 10A to 10C are aberration diagrams of the zoom lens according to the fifth embodiment.

FIGS. 12A to 12C are aberration diagrams of the zoom lens according to the sixth embodiment.

FIGS. 14A to 14C are aberration diagrams of the zoom lens according to the seventh embodiment.

FIGS. 16A to 16C are aberration diagrams of the zoom lens according to the eighth embodiment.

DESCRIPTION OF THE EMBODIMENTS

Figure 1:
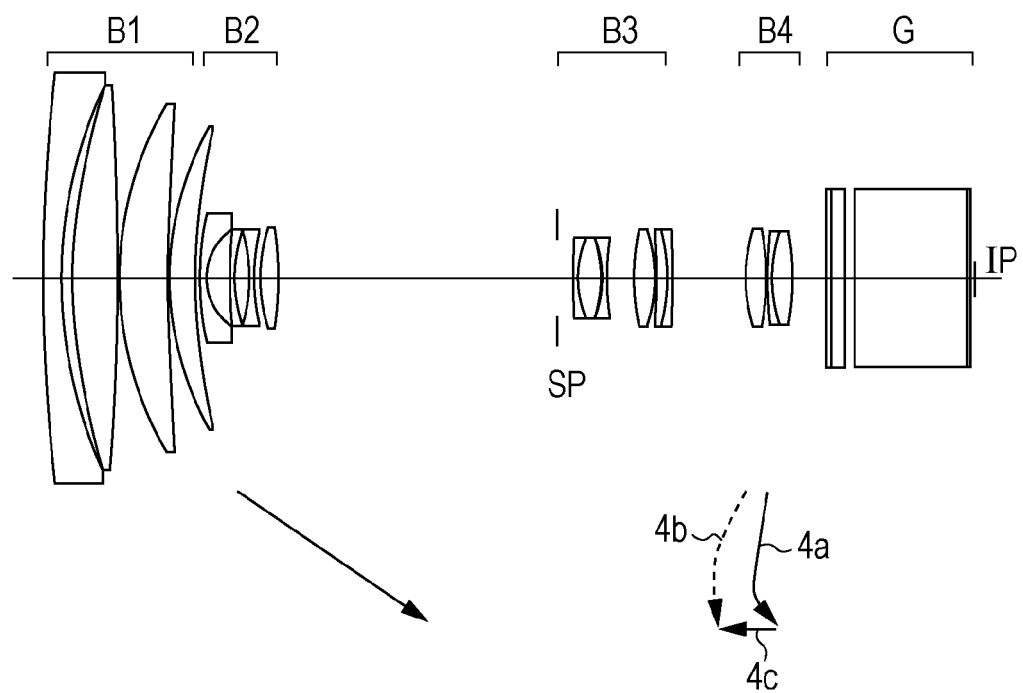
FIG. 1 is a cross-sectional view of a zoom lens according to a first embodiment at the wide-angle end.

Referring to the drawings, a zoom lens and an image pickup apparatus having the same according to embodiments of the present invention will be described below. The zoom lens of the present invention includes, in order from the object side to the image side, a first lens group having positive refractive power, a second lens group having negative refractive power, a third lens group having positive refractive power, and a fourth lens group having positive refractive power. During zooming, at least the second and fourth lens groups are moved along the optical axis.

Figure 3:
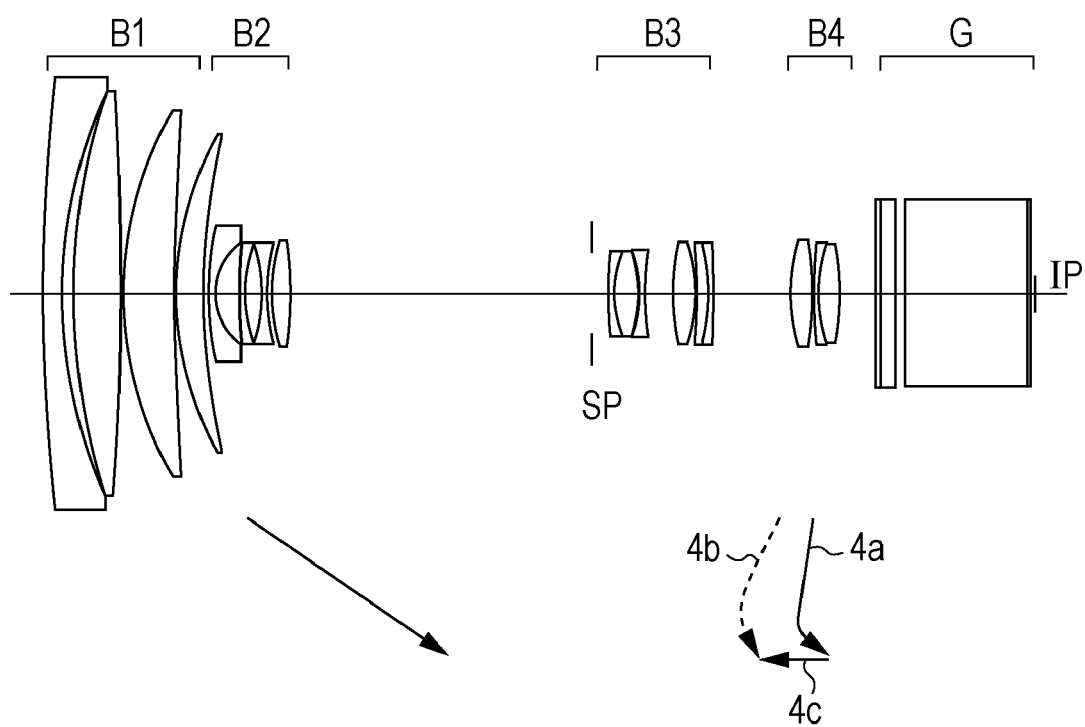
FIG. 3 is a cross-sectional view of a zoom lens according to a second embodiment at the wide-angle end.
Figure 5:
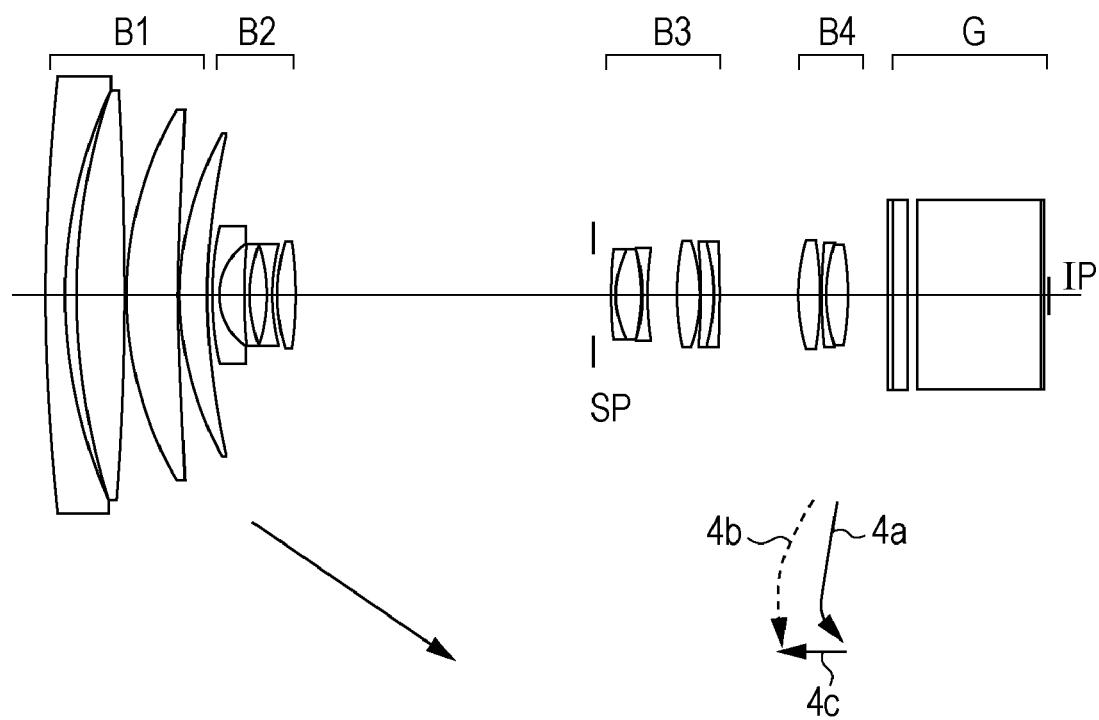
FIG. 5 is a cross-sectional view of a zoom lens according to a third embodiment at the wide-angle end.
Figure 7:
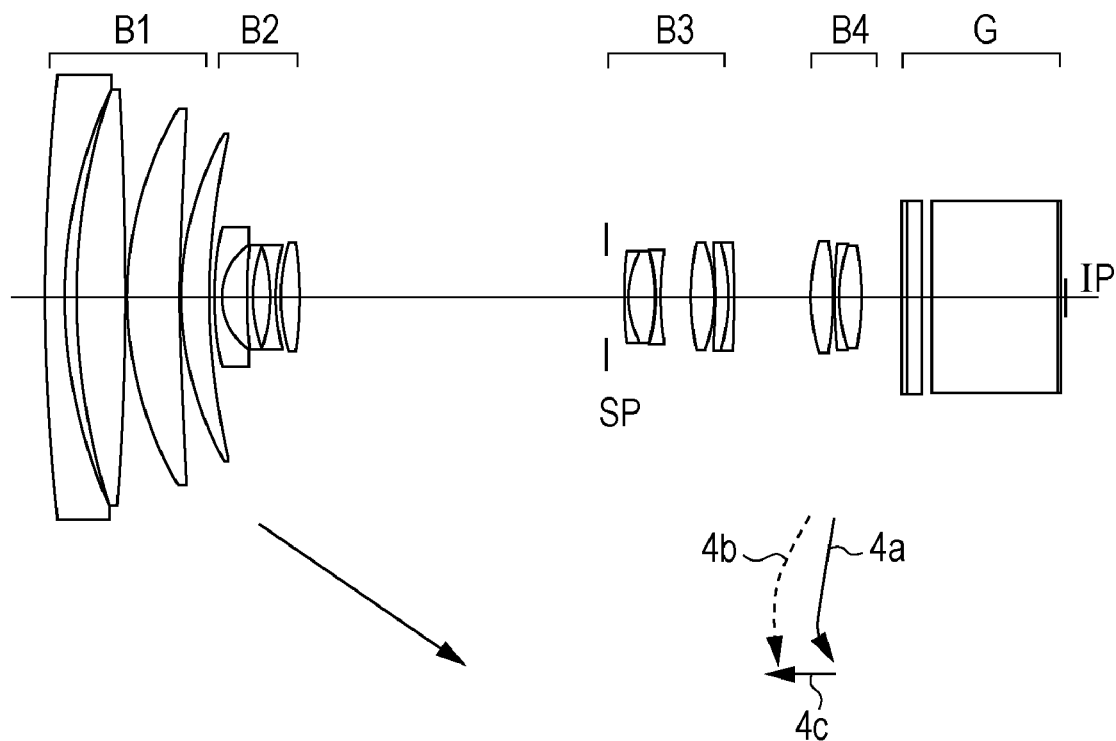
FIG. 7 is a cross-sectional view of a zoom lens according to a fourth embodiment at the wide-angle end.
Figure 8B:
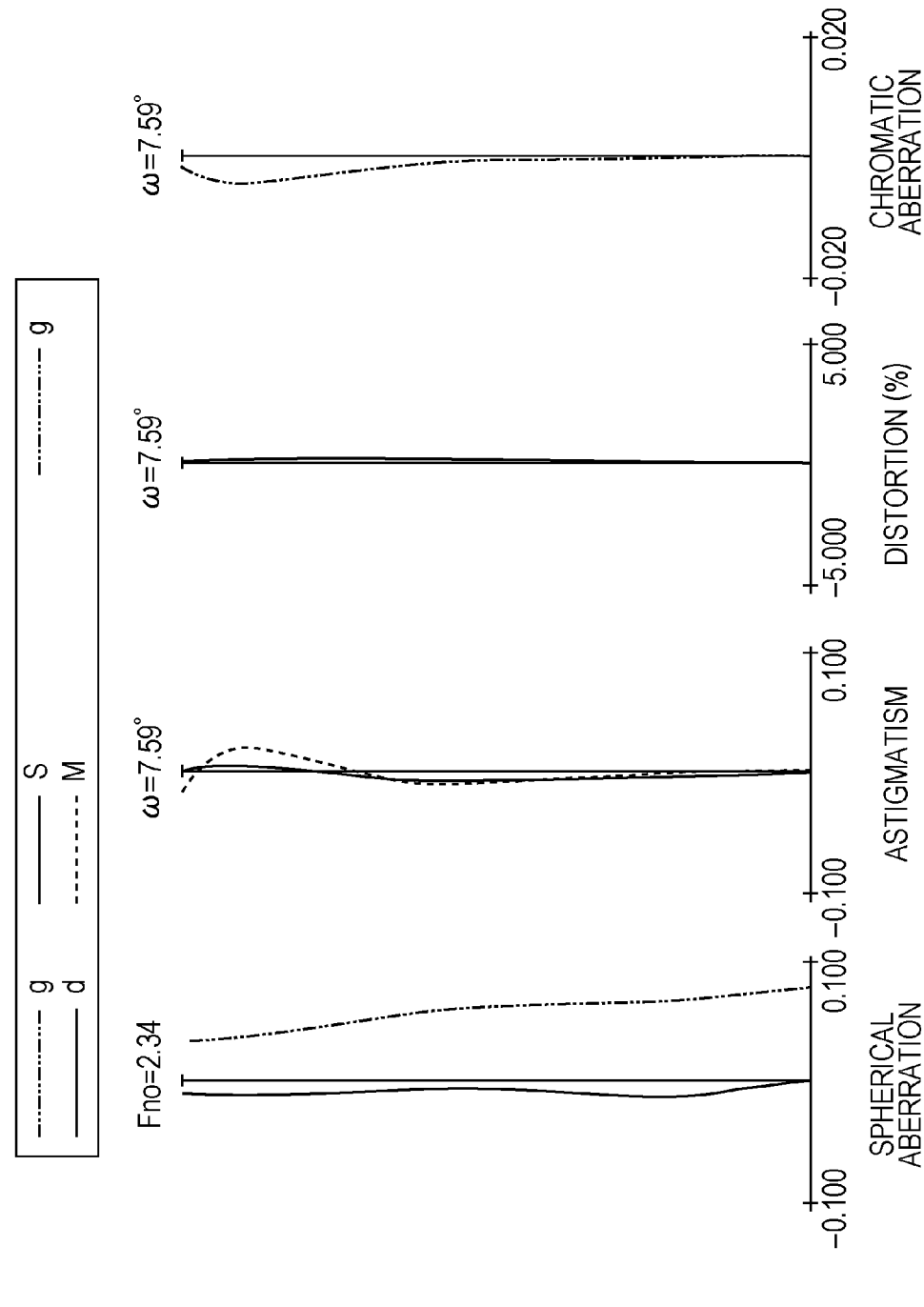
Figure 9:
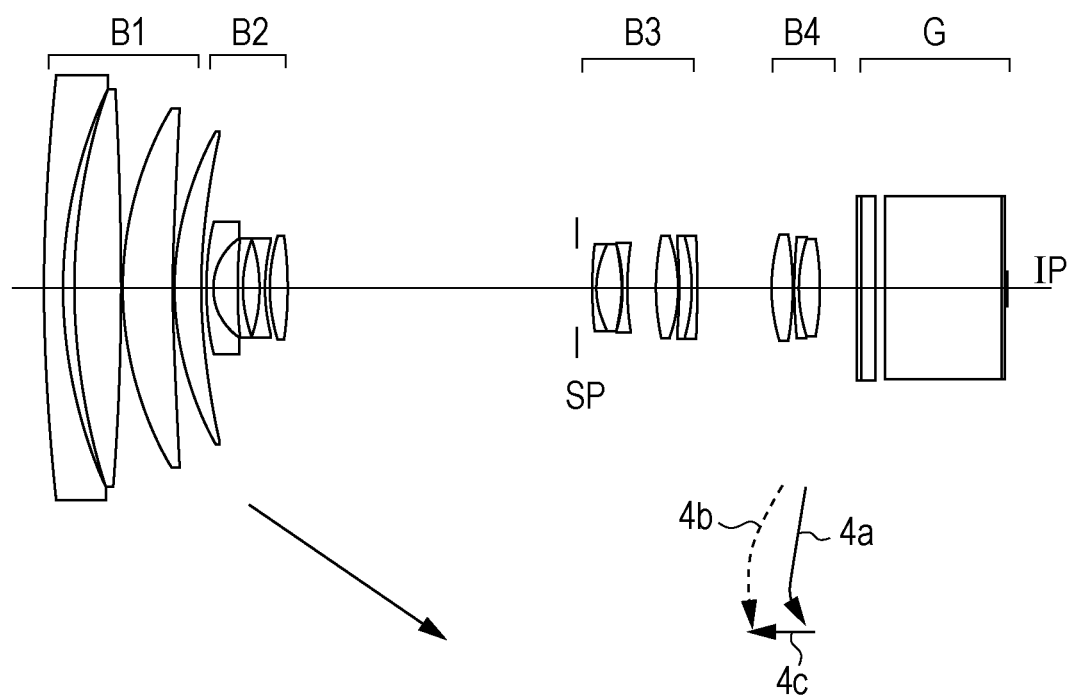
FIG. 9 is a cross-sectional view of a zoom lens according to a fifth embodiment at the wide-angle end.
Figure 11:
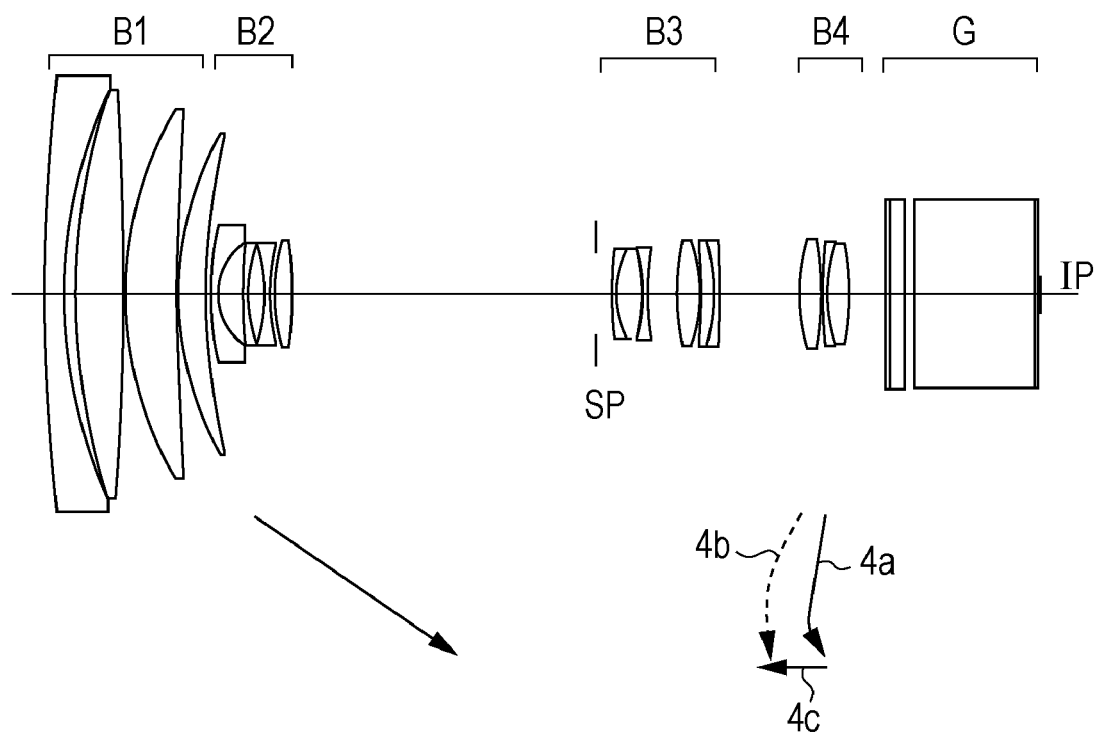
FIG. 11 is a cross-sectional view of a zoom lens according to a sixth embodiment at the wide-angle end.
Figure 13:
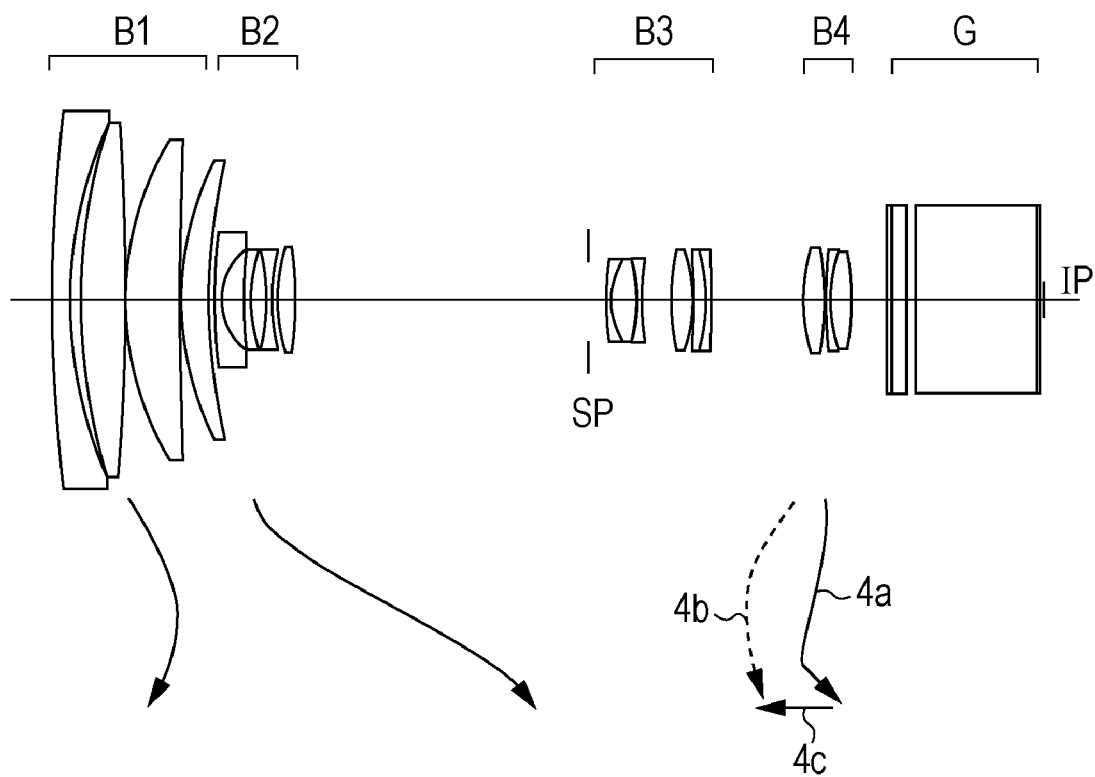
FIG. 13 is a cross-sectional view of a zoom lens according to a seventh embodiment at the wide-angle end.
Figure 14A:
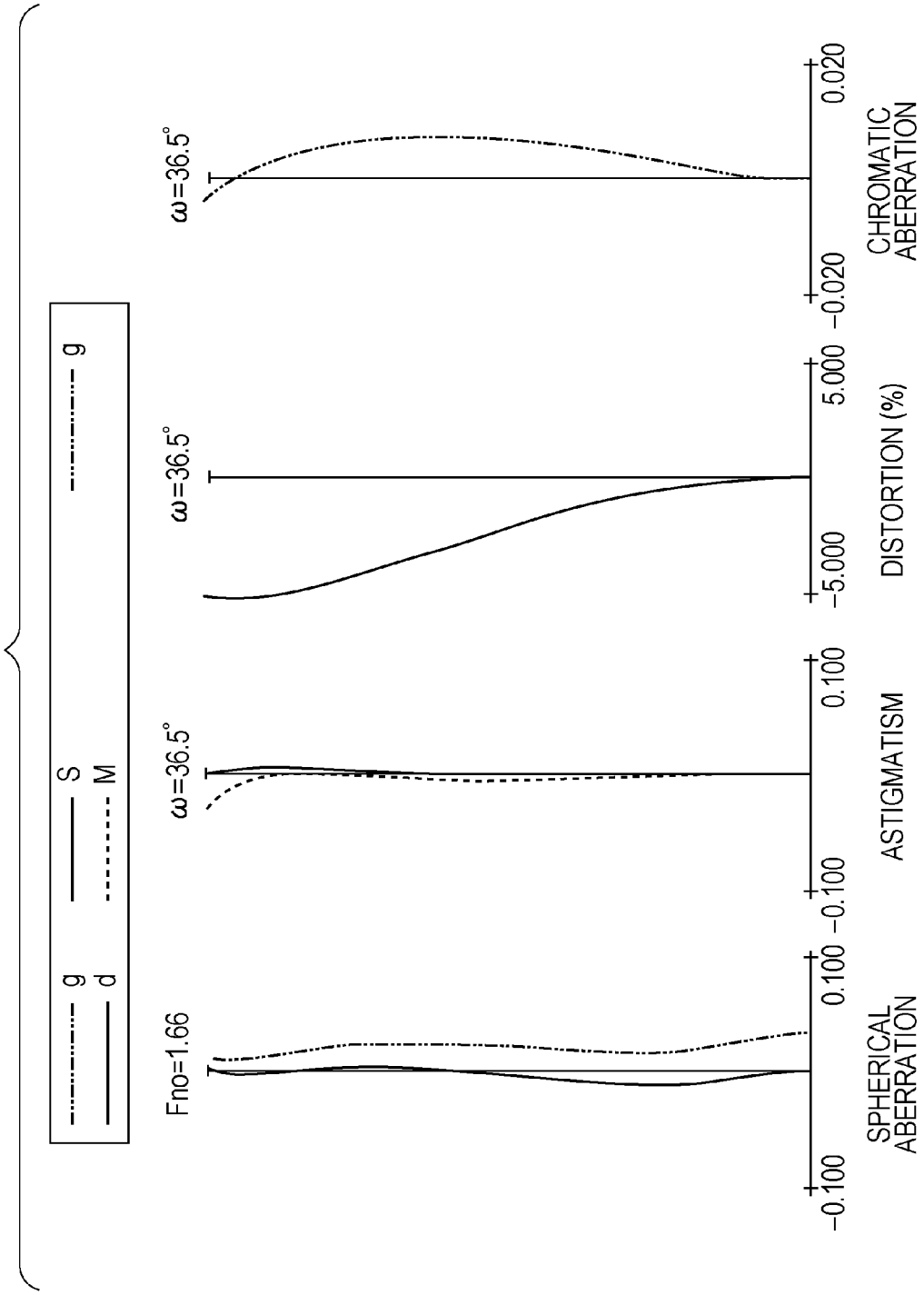
Figure 15:
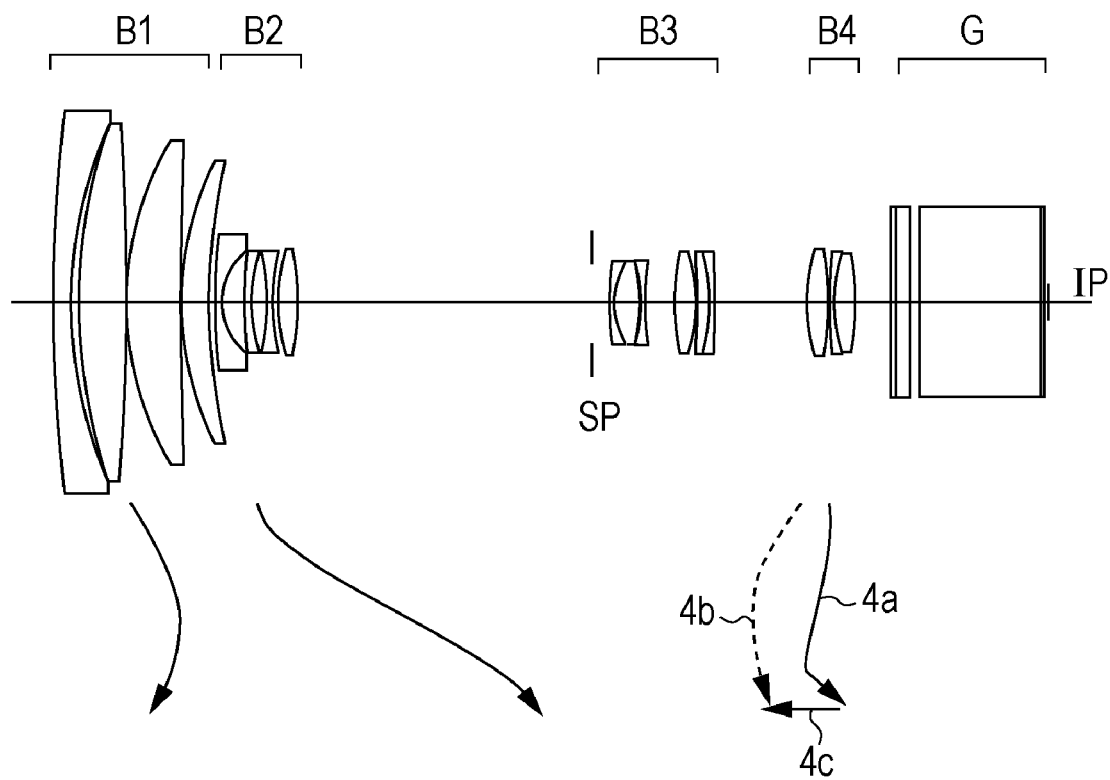
FIG. 15 is a cross-sectional view of a zoom lens according to an eighth embodiment at the wide-angle end.
Figure 16C:
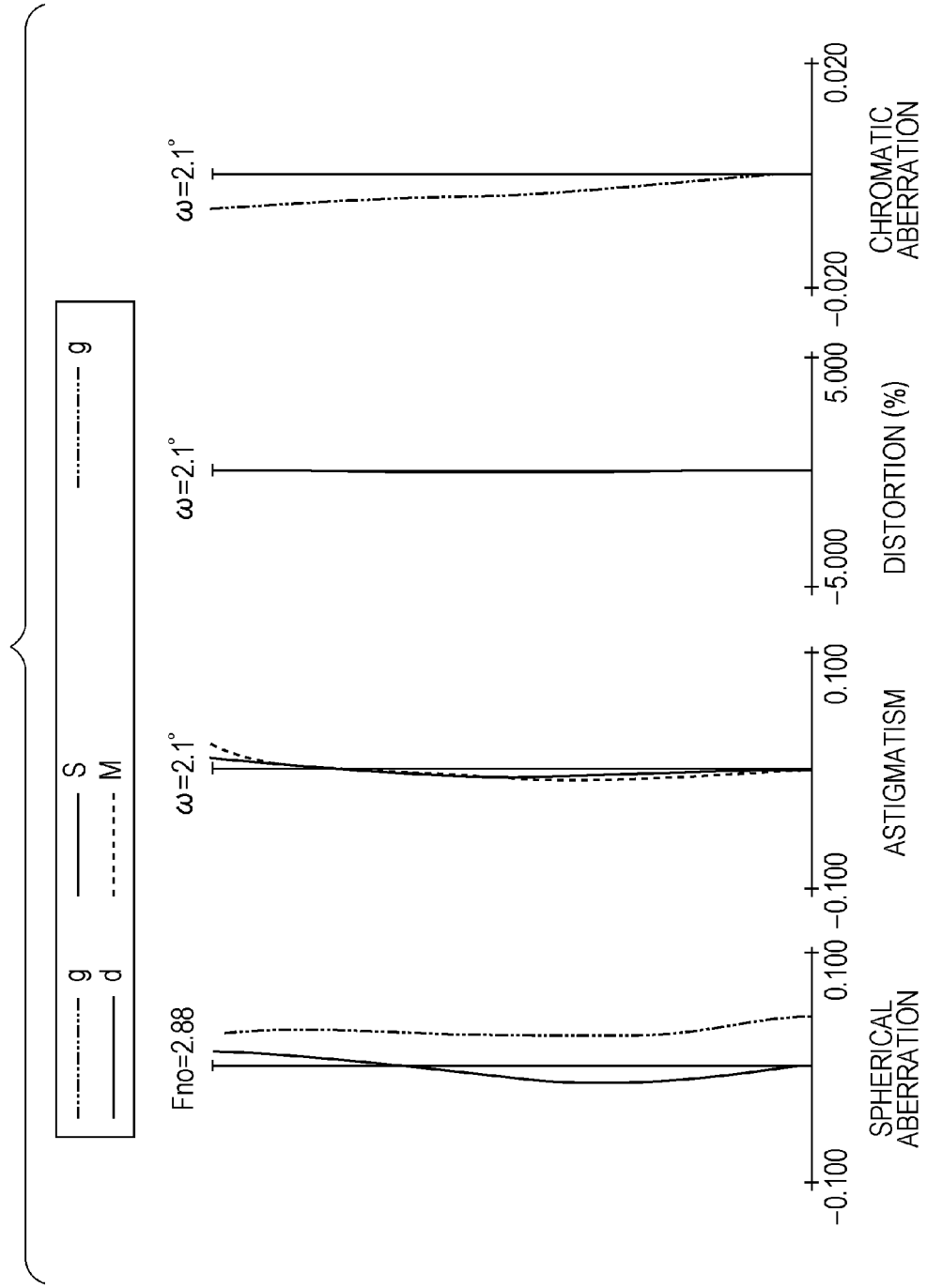
Figure 17:
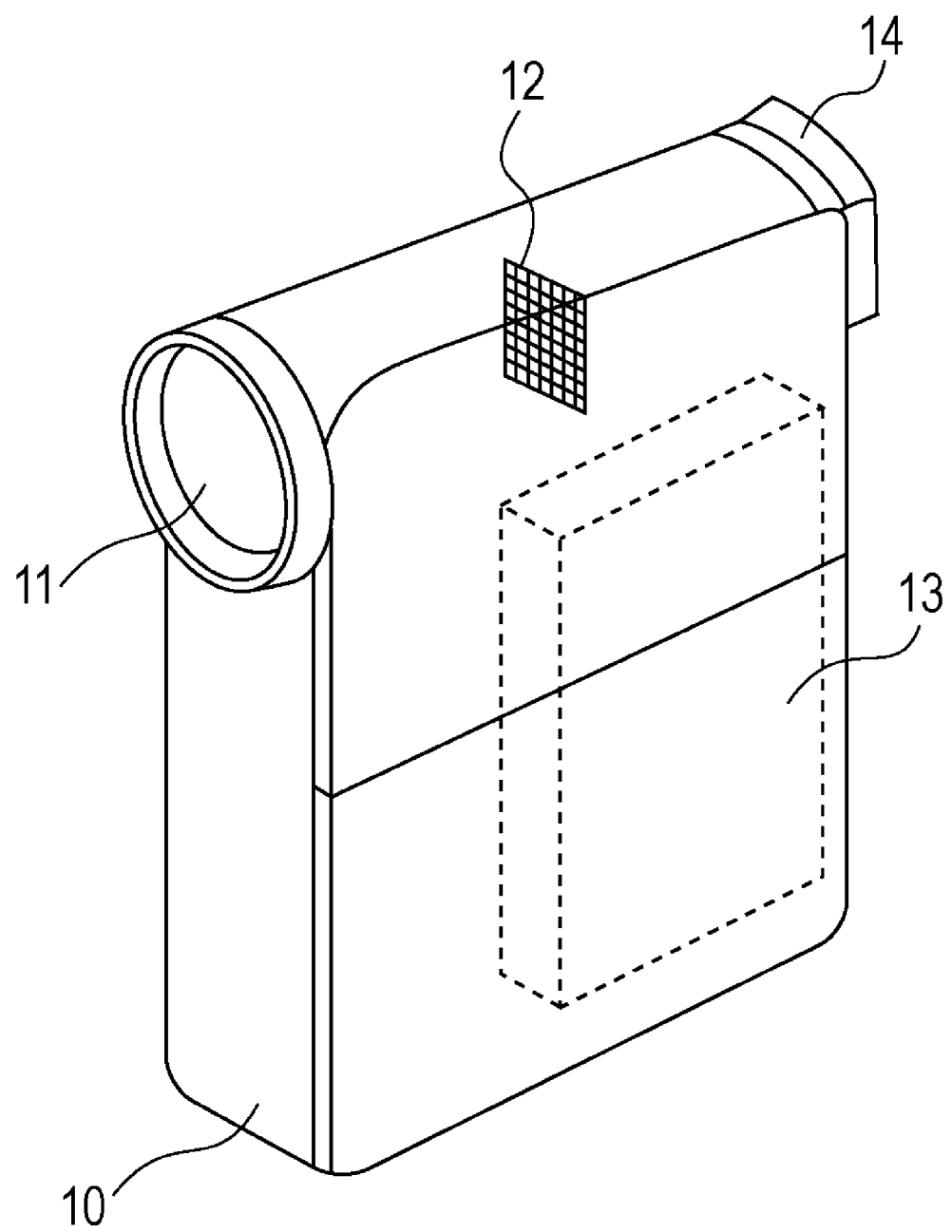
FIG. 17 is a schematic view of the relevant parts of an image pickup apparatus according to an embodiment of the present invention.

FIG. 1 is a cross-sectional view of a zoom lens according to a first embodiment at the wide-angle end, and FIGS. 2A, 2B, and 2C are aberration diagrams of the zoom lens according to the first embodiment at the wide-angle end (short focal length end), at the intermediate zooming position, and at the telephoto end (long focal length end), respectively, when focused on an object at infinity. FIG. 3 is a cross-sectional view of a zoom lens according to a second embodiment at the wide-angle end, and FIGS. 4A, 4B, and 4C are aberration diagrams of the zoom lens according to the second embodiment at the wide-angle end, at the intermediate zooming position, and at the telephoto end, respectively, when focused on an object at infinity. FIG. 5 is a cross-sectional view of a zoom lens according to a third embodiment at the wide-angle end, and FIGS. 6A, 6B, and 6C are aberration diagrams of the zoom lens according to the third embodiment at the wide-angle end, at the intermediate zooming position, and at the telephoto end, respectively, when focused on an object at infinity. FIG. 7 is a cross-sectional view of a zoom lens according to a fourth embodiment at the wide-angle end, and FIGS. 8A, 8B, and 8C are aberration diagrams of the zoom lens according to the fourth embodiment at the wide-angle end, at the intermediate zooming position, and at the telephoto end, respectively, when focused on an object at infinity. FIG. 9 is a cross-sectional view of a zoom lens according to a fifth embodiment at the wide-angle end, and FIGS. 10A, 10B, and 10C are aberration diagrams of the zoom lens according to the fifth embodiment at the wide-angle end, at the intermediate zooming position, and at the telephoto end, respectively, when focused on an object at infinity. FIG. 11 is a cross-sectional view of a zoom lens according to a sixth embodiment at the wide-angle end, and FIGS. 12A, 12B, and 12C are aberration diagrams of the zoom lens according to the sixth embodiment at the wide-angle end, at the intermediate zooming position, and at the telephoto end, respectively, when focused on an object at infinity. FIG. 13 is a cross-sectional view of a zoom lens according to a seventh embodiment at the wide-angle end, and FIGS. 14A, 14B, and 14C are aberration diagrams of the zoom lens according to the seventh embodiment at the wide-angle end, at the intermediate zooming position, and at the telephoto end, respectively, when focused on an object at infinity. FIG. 15 is a cross-sectional view of a zoom lens according to an eighth embodiment at the wide-angle end, and FIGS. 16A, 16B, and 16C are aberration diagrams of the zoom lens according to the eighth embodiment at the wide-angle end, at the intermediate zooming position, and at the telephoto end, respectively, when focused on an object at infinity. FIG. 17 is a schematic view of the relevant parts of a video camera (as an example of an image pickup apparatus) having the zoom lens of the present invention. In the cross-sectional views, B1 denotes the first lens group having positive refractive power (optical power=the reciprocal of the focal length), B2 denotes the second lens group having negative refractive power, B3 denotes the third lens group having positive refractive power, and B4 denotes the fourth lens group having positive refractive power.

G denotes an optical block corresponding to an optical filter, a faceplate, etc., and is shown as a fifth lens group having no refractive power in numerical embodiments described below. IP denotes the image plane, which corresponds to the image pickup surface of a solid-state image-pickup element (photoelectric conversion element), such as a CCD sensor or a CMOS sensor, when the zoom lens is used as the imaging optical system of a video camera or a digital still camera and corresponds to the film surface when the zoom lens is used with a silver-halide film camera. SP denotes the aperture stop, which is provided on the object side of the third lens group B3. In SPHERICAL ABERRATION diagrams, solid line indicates d-line, and two-dot chain line indicates g-line. In ASTIGMATISM diagrams, dashed line indicates the meridional image plane, and solid line indicates the sagittal image plane. Lateral CHROMATIC ABERRATION is shown by g-line. Fno denotes the F-number, ω denotes the half field angle. In the embodiments described below, the zooming positions at the wide-angle end and at the telephoto end are positions where the lens group for zooming (in the embodiments, the second lens group B2) is located at one end and at the other end, respectively, of the area in which it can be moved on the optical axis structurally.

In the embodiments, when zooming from the wide-angle-end to the telephoto-end is performed, at least the second lens group B2 is moved to the image side to perform zooming, and the fourth lens group B4 is moved so as to have a part of a locus convex toward the object side to correct image plane variation caused by zooming. In addition, a rear-focusing method in which the fourth lens group B4 is moved along the optical axis to perform focusing is employed. A solid-line arrow extending away from the second group lens B2 and pointing towards the image side illustrates a movement path of the second lens group B2 during zooming. A solid-line curve 4a and a dashed-line curve 4b illustrate the loci of movement of the fourth lens group B4 for correcting image plane variation caused by zooming from the wide-angle-end to the telephoto-end when focused on an object at infinity and on a near object, respectively. By making the fourth lens group B4 move along a locus convex toward the object side, the space between the third lens group B3 and the fourth lens group B4 can be efficiently used, thereby effectively reducing the overall length of the lens. Note that the third lens group B3 is not moved for zooming or focusing. In the zoom lens according to the first to sixth embodiments, the first lens group B1 is not moved for zooming or focusing, and, in the zoom lens according to the seventh and eighth embodiments, the first lens group B1 moves along a locus convex toward the image side during zooming.

In the embodiments, at the telephoto-end zooming position, for example, when focusing is performed from an object at infinity to a near object, the fourth lens group B4 is moved frontward, as shown by the arrow 4c. In the embodiments, some or all of the lenses in the third lens group B3 are moved so as to have a component perpendicular to the optical axis to shift the image-forming position, thereby correcting an image blur occurring when the entire optical system is shaken.

The zoom lenses according to the embodiments have lens groups having, in order from the object side to the image side, positive refractive power, negative refractive power, positive refractive power, and positive refractive power to achieve a high magnification ratio (high zoom ratio) while securing a wide field angle (photographic field angle) at the wide-angle end. By moving at least the second lens group B2 and the fourth lens group B4 during zooming from the wide-angle end to the telephoto end, the zoom lens having a high zoom ratio and high performance is achieved. In addition, a high zoom ratio is achieved by moving a small number of lens groups. In particular, by increasing the negative refractive power of the second lens group B2 for zooming, a high zoom ratio is achieved with a short traveling distance. Although an increased negative refractive power of the second lens group B2 makes aberration correction within the second lens group B2 difficult, the refractive power of the second lens group B2 is adjusted to an appropriate level by using three negative lenses in the second lens group B2. Thus, a high zoom ratio and high performance are achieved.

The technical significance of the lens configuration of the second lens group B2 will be described below. The second lens group B2 includes, in order from the object side to the image side, a negative lens (a lens having negative refractive power), a negative lens, a negative lens, and a positive lens. If the negative refractive power of the second lens group B2 is increased to achieve a higher zoom ratio, the Petzval sum increases in the negative direction, increasing the curvature of field. Furthermore, during zooming from the wide-angle end to the telephoto end, significant variation of the coma aberration and the astigmatism occur, and aberration correction is difficult. Thus, by using three negative lenses in the second lens group B2 to reduce the power of each lens, the Petzval sum is decreased. In addition, by disposing three negative lenses on the object side, the principal point of the second lens group B2 is brought closer to the object side, thereby reducing the distance between the principal points of the first lens group B1 and second lens group B2. As a result, the first lens group B1 can be brought close to the aperture stop SP, making it possible to reduce the height of the off-axis rays from the optical axis passing through the first lens group B1, which defines the effective diameter of the first lens group B1. Thus, the size of the first lens group B1 is reduced while increasing the field angle at the wide-angle end. It is preferable that the second lens group B2 include one or more aspherical surfaces to correct aberrations. This configuration makes it easy to effectively correct variations in astigmatism occurring during zooming from the wide-angle end to the telephoto end and distortion at the wide-angle end which is likely to increase when the field angle is increased.

In the embodiments, the first lens group B1 includes, in order from the object side to the image side, a negative lens, a positive lens, a positive lens, and a positive lens. More specifically, the first lens group B1 includes, in order from the object side to the image side, a negative lens, a biconvex positive lens, a positive lens having a convex surface on the object side, and a meniscus positive lens having a convex surface on the object side. An image blur occurring when the image pickup apparatus is shaken is corrected by moving some or all of the lenses in the third lens group B3 so as to have a component perpendicular to the optical axis, thereby shifting the image-forming position of the object image. Because the third lens group B3 is fixed with respect to the image plane during zooming, it is easy to install a mechanism for moving some or all of the lenses in the third lens group B3 so as to have a component perpendicular to the optical axis. The third lens group B3 includes one or more aspherical surfaces. In the third lens group B3, especially at the wide-angle end, the axial rays pass at a high position, causing significant spherical aberration and coma aberration. By employing an aspherical surface, more effective aberration correction becomes easy. The third lens group B3 includes a lens having aspherical surfaces on both sides. In the third lens group B3, in the intermediate zoom region, off-axis rays pass at a high position, causing significant astigmatism and curvature of field. By employing an aspherical surface, more effective aberration correction becomes easy. Furthermore, by providing aspherical surfaces on both sides, aberration correction at the wide-angle end and aberration correction in the intermediate zoom region can be easily and simultaneously performed without increasing the number of aspherical lenses.

The fourth lens group B4 includes, in order from the object side to the image side, a positive lens and a cemented lens composed of a negative lens and a positive lens. The fourth lens group B4 includes one or more aspherical surfaces and performs focusing operation. This lens configuration enables the aberration variation occurring during focusing operation to be effectively corrected. The fourth lens group B4 includes a lens having aspherical surfaces on both sides. In the fourth lens group B4, at the telephoto end, off-axis rays pass at a high position, causing significant astigmatism and curvature of field. By employing an aspherical surface, more effective aberration correction becomes easy. Furthermore, by providing aspherical surfaces on both sides, correction of aberration variation occurring during focusing operation and aberration correction at the telephoto end can be easy and simultaneously performed. In particular, the fourth lens group B4 includes a positive lens on the object side and a cemented lens composed of a negative lens and a positive lens on the image side. More specifically, the fourth lens group B4 includes, in order from the object side to the image side, a biconvex positive lens and a cemented lens composed of a meniscus negative lens having a concave surface on the image side and a positive lens having a convex surface on the object side. This configuration reduces the aberration variation occurring during focusing. In the embodiments, the following is satisfied:

$$0.54 < |f2|/\sqrt{(fw \cdot ft)} < 0.66 \tag{1}$$

where f2 is the focal length of the second lens group B2, and fw and ft are the focal length at the wide-angle end and the focal length at the telephoto end, respectively, of the entire optical system.

The conditional expression (1) relates to the zooming power and aberration correction function of the second lens group B2 during zooming. If the value is below the lower limit of the conditional expression (1), image plane variation and variation in lateral chromatic aberration over the entire zoom range become significant, making it difficult to maintain high optical performance. Furthermore, if the value exceeds the upper limit, the traveling distance of the second lens group B2 during zooming increases, making size reduction difficult. In order to more effectively suppress image plane variation caused by zooming from the wide-angle end to the telephoto end while achieving a high zoom ratio (a high magnification ratio), it is more preferable that the numerical range of the conditional expression (1) satisfy the following conditional expression (1a).

$$0.545 < |f2|/\sqrt{(fw \cdot ft)} < 0.650 \tag{1a}$$

With the above-described configurations, a zoom lens having a wide field angle, a high zoom ratio, and high optical performance over the entire zoom range can be obtained. In the embodiments, it is more preferable that at least one of the following conditions be satisfied:

$$1.85 < N2N \tag{2}$$

$$\nu 2P < 22 \tag{3}$$

$$0.7 < ft/ft < 1.0 \tag{4}$$

$$65 < V1A < 75 \tag{5}$$

$$70 < V1B \tag{6}$$

where N2N is the refractive index of the material of one negative lens in the second lens group B2, ν2P is the Abbe number of the material of one positive lens in the second lens group B2 f1 is the focal length of the first lens group B1, ft is the focal length of the entire optical system at the telephoto end, V1A is the Abbe number of the material of one positive lens in the first lens group B1, and V1B is the Abbe number of the material of another positive lens in the first lens group B1.

The conditional expression (2) defines the preferable range of the refractive index of the lens material of the negative lens in the second lens group B2. If the value is below the range defined by the conditional expression (2), the refractive index of the lens material of the negative lens in the second lens group B2 decreases. In order to obtain an equivalent refractive power with a decreased refractive index of the lens material, the radius of curvature needs to be reduced. If the radius of curvature of the negative lens is reduced, the volume of the lens, including the edge thereof, increases, resulting in weight increase. Because the second lens group B2 is moved in the optical axis direction during zooming, it is desirable that the weight be reduced as much as possible, from the standpoint of the zooming speed, the responsiveness to zooming operation, and the operational feeling. Furthermore, in order to increase the radius of curvature of the negative lens in the second lens group B2 to reduce the weight, it is more preferable that the numerical range of the conditional expression (2) satisfy the following conditional expression (2a).

$$1.95 < N21 \quad (2a)$$

By satisfying the conditional expression (2a), the curvature of the lens on the extreme object side in the second lens group B2 which has the largest volume in the second lens group B2 can be increased, which is more preferable in reducing the volume and weight.

The conditional expression (3) defines the preferable range of the Abbe number of the lens material of the positive lens in the second lens group B2. If the value exceeds the range defined by the conditional expression (3), lateral chromatic aberration at the wide-angle end increases. Longitudinal chromatic aberration at the telephoto end also increases, making it difficult to achieve high performance. In addition, in order to reduce lateral chromatic aberration at the wide-angle end and longitudinal chromatic aberration at the telephoto end, it is more preferable that the numerical range of the conditional expression (3) satisfy the following conditional expression (3a).

$$V2P < 21 \quad (3a)$$

In order to achieve a high zoom ratio while maintaining high performance, it is preferable that the first lens group B1 have four-lens configuration; a negative lens, a positive lens, a positive lens, and a positive lens. It is preferable that the focal length, f1, of the first lens group B1 satisfy the conditional expression (4).

The conditional expression (4) defines the preferable range of the power (refractive power) of the first lens group B1 relative to the focal length of the entire optical system at the telephoto end. If the value is below the lower limit of the conditional expression (4), the power of the first lens group B1 is too strong, causing significant aberrations, especially curvature of field and astigmatism, in the first lens group B1. In order to effectively correct these aberrations, the number of lenses needs to be increased or an aspherical surface needs to be added. In contrast, if the value exceeds the upper limit of the conditional expression (4), it is advantageous to correct aberrations. However, the effective diameter of the first lens group B1 increases, which is undesirable. It is more preferable that the numerical range of the conditional expression (4) satisfy the following conditional expression (4a).

$$0.75 < f1/ft < 9.5 \quad (4a)$$

The conditional expressions (5) and (6) define the preferable range of the Abbe number of the lens material of one of the positive lenses in the first lens group B1. If the values are lower than the lower limits of the conditional expressions (5) and (6), it is difficult to effectively correct lateral chromatic aberration and longitudinal chromatic aberration at the telephoto end. If a low-dispersion lens material exceeding these conditional expressions (5) and (6) is used, the refractive index also decreases, making correction of spherical aberration difficult.

It is more preferable that the numerical ranges of the conditional expressions (5) and (6) satisfy the following conditional expressions (5a) and (6a).

$$67 < V1A < 72 \quad (5a)$$

$$70.1 < V1B \quad (6a)$$

In the embodiments, by employing the above-described configurations, a high-performance zoom lens having a wide field angle, i.e., a field angle, $2\omega$, at the wide-angle end of 71.2° to 73°, and a high zoom ratio of 18× to 20× is achieved. In the embodiments, a lens group having a small refractive power may be added on the object side of the first lens group B1 or on the image side of the fourth lens group B4. In addition, a teleconverter lens or a wide converter lens may be disposed on the object side or on the image side.

First to eighth numerical embodiments corresponding to the first to eighth embodiments will be shown below. In the numerical embodiments, i represents the number of surfaces counted from the object side, ri represents the i-th (the i-th surface's) radius of curvature, di represents the distance between the i-th surface and the i-th+1 surface, and ndi and vdi respectively represent the refractive index and Abbe number for the d-line of the material of the i-th optical member. In the first to eighth numerical embodiments, six surfaces on the extreme image side are flat surfaces corresponding to the optical block. The shape of the aspherical surface is expressed as follows:

$$X = \frac{\frac{H^2}{R}}{1 + \sqrt{1 - (1+k)\left(\frac{H}{R}\right)^2}} + A3H^3 + A4H^4 + A5H^5 + A6H^6 +$$

$$A7H^7 + A8H^8 + A9H^9 + A10H^{10} + A11H^{11} + A12H^{12} + A13H^{13}$$

where X is the displacement in the optical axis direction at a height H from the optical axis with respect to the surface vertex, the traveling direction of light is defined as positive, R is the paraxial radius of curvature, k is the conic constant, and A3 to A13 are aspherical surface coefficients.

In the numerical embodiments, from A3 to A13, items not shown are 0, star marks (*) denote aspherical surfaces, "e-x" means $10^{-x}$, where "x" represents a given value; and BF means the back focus. The relationship between the above conditional expressions and the numerical values in the numerical embodiments is shown in Table 1.

[Numerical Embodiment 1]

| unit mm | | | | |
|---|---|---|---|---|
| surface data | | | | |
| surface number | r | d | nd | vd |
| 1 | 318.471 | 3.20 | 1.84666 | 23.9 |
| 2 | 79.665 | 1.88 | | |
| 3 | 105.168 | 7.87 | 1.59319 | 67.9 |
| 4 | −443.202 | 0.20 | | |
| 5 | 60.442 | 8.61 | 1.49700 | 81.5 |
| 6 | 457.728 | 0.20 | | |
| 7 | 52.824 | 4.55 | 1.83481 | 42.7 |
| 8 | 112.737 | (variable) | | |
| 9 | 65.502 | 1.15 | 2.00069 | 25.5 |
| 10 | 10.807 | 3.90 | | |
| 11 | 105.788 | 1.00 | 1.86400 | 40.6 |
| 12* | 31.349 | 2.41 | | |
| 13 | −26.972 | 0.85 | 1.77250 | 49.6 |
| 14 | 35.658 | 1.19 | | |
| 15 | 31.147 | 3.10 | 1.94595 | 18.0 |
| 16 | −55.157 | (variable) | | |
| 17 (stop) | ∞ | 2.73 | | |
| 18 | 94.677 | 0.80 | 1.88300 | 40.8 |
| 19 | 15.502 | 4.20 | 1.84666 | 23.9 |

-continued unit mm

| | | | | |
|---|---|---|---|---|
| 20 | −25.424 | 0.14 | | |
| 21 | −22.315 | 0.80 | 2.00330 | 28.3 |
| 22 | 65.817 | 4.75 | | |
| 23* | 47.103 | 3.60 | 1.58313 | 59.4 |
| 24* | −26.350 | 0.20 | | |
| 25 | −204.574 | 2.00 | 1.48749 | 70.2 |
| 26 | −34.181 | 0.80 | 1.80518 | 25.4 |
| 27 | −236.092 | (variable) | | |
| 28* | 30.446 | 3.60 | 1.58313 | 59.4 |
| 29* | −47.912 | 0.20 | | |
| 30 | 89.803 | 0.90 | 1.92286 | 18.9 |
| 31 | 29.082 | 3.50 | 1.51633 | 64.1 |
| 32 | −37.022 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| image plane | ∞ | | | | aspherical surface data

12th surface

K = −1.50514e+001    A4 = 6.00285e−005    A6 = −1.50604e−007
A8 = −1.01899e−009   A10 = 2.69112e−011   A12 = 4.79984e−014

23rd surface

K = 6.02208e+000
A3 = 1.77478e−005    A5 = −2.17672e−006   A7 = −5.57323e−009
A9 = 2.05066e−010    A11 = −1.17497e−012

24th surface

K = −4.79881e+000
A3 = 5.67317e−006    A5 = −3.80459e−006   A7a = 2.38819e−008
A9 = −8.23521e−011

28th surface

K = 6.00573e−003     A4 = 1.94847e−005    A6 = −2.31853e−007
A8 = 1.72707e−009    A10 = 2.04797e−011

29th surface

K = −7.31653e+000    A4 = 3.06179e−005    A6 = −2.22436e−007
A8 = 1.98088e−009    A10 = 2.07228e−011 various data
zoom ratio 17.69

| | | | | | | |
|---|---|---|---|---|---|---|
| focal length | 4.10 | 21.91 | 72.53 | 7.53 | 40.89 | 5.87 |
| F-number | 1.66 | 2.34 | 2.88 | 1.81 | 2.65 | 1.72 |
| field angle | 36.46 | 7.87 | 2.39 | 21.92 | 4.24 | 27.30 |
| image height | 3.03 | 3.03 | 3.03 | 3.03 | 3.03 | 3.03 |
| overall length of lens | 153.32 | 153.32 | 153.32 | 153.32 | 153.32 | 153.32 |
| BF | 22.83 | 26.34 | 23.78 | 24.23 | 26.26 | 23.65 |
| d8 | 0.77 | 35.08 | 46.52 | 16.78 | 41.94 | 10.84 |
| d16 | 48.62 | 14.31 | 2.88 | 32.61 | 7.45 | 38.55 |
| d27 | 12.77 | 9.27 | 11.82 | 11.37 | 9.34 | 11.95 |
| d32 | 5.81 | 9.32 | 6.77 | 7.21 | 9.25 | 6.63 | zoom-lens-group data

| group | first surface | focal length |
|---|---|---|
| 1 | 1 | 66.28 |
| 2 | 9 | −10.96 |
| 3 | 17 | 108.04 |
| 4 | 28 | 25.23 |
| 5 | 33 | ∞ |

[Numerical Embodiment 2]

unit mm surface data

| surface number | r | d | nd | vd |
|---|---|---|---|---|
| 1 | 301.174 | 3.20 | 1.84666 | 23.9 |
| 2 | 80.298 | 1.68 | | |
| 3 | 103.728 | 7.87 | 1.59319 | 67.9 |
| 4 | −426.609 | 0.20 | | |
| 5 | 59.636 | 8.61 | 1.49700 | 81.5 |
| 6 | 453.779 | 0.20 | | |
| 7 | 53.838 | 4.55 | 1.83481 | 42.7 |
| 8 | 109.172 | (variable) | | |
| 9 | 63.931 | 1.15 | 2.00069 | 25.5 |
| 10 | 10.905 | 3.88 | | |
| 11 | 110.681 | 1.00 | 1.86400 | 40.6 |
| 12* | 30.264 | 2.64 | | |
| 13 | −26.486 | 0.85 | 1.77250 | 49.6 |
| 14 | 39.205 | 0.85 | | |
| 15 | 30.538 | 3.10 | 1.94595 | 18.0 |
| 16 | −55.676 | (variable) | | |
| 17 (stop) | ∞ | 2.73 | | |
| 18 | 90.027 | 0.80 | 1.88300 | 40.8 |
| 19 | 15.533 | 4.20 | 1.84666 | 23.9 |
| 20 | −25.123 | 0.13 | | |
| 21 | −22.301 | 0.80 | 2.00330 | 28.3 |
| 22 | 65.433 | 4.75 | | |
| 23* | 46.951 | 3.60 | 1.58313 | 59.4 |
| 24* | −26.833 | 0.20 | | |
| 25 | −211.791 | 2.00 | 1.48749 | 70.2 |
| 26 | −34.814 | 0.80 | 1.80518 | 25.4 |
| 27 | −237.687 | (variable) | | |
| 28* | 30.529 | 3.60 | 1.58313 | 59.4 |
| 29* | −48.824 | 0.20 | | |
| 30 | 90.537 | 0.90 | 1.92286 | 18.9 |
| 31 | 28.913 | 3.50 | 1.51633 | 64.1 |
| 32 | −37.602 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| image plane | ∞ | | | | aspherical surface data

12th surface

K = −1.10481e+001    A4 = 5.68929e−005    A6 = −9.31431e−008
A8 = 1.95577e−009    A10 = −4.65699e−012  A12 = 5.82349e−014

23rd surface

K = 4.57308e+000
A3 = 2.12129e−005    A5 = −2.14454e−006   A7 = −3.25410e−009
A9 = 1.69980e−010    A11 = −9.80470e−013

24th surface

K = −4.86060e+000
A3 = 4.33522e−006    A5 = −3.73578e−006   A7 = 2.22220e−008
A9 = −7.12145e−011

28th surface

K = 9.24307e−003     A4 = 1.95898e−005    A6 = −2.24315e−007
A8 = 1.90519e−009    A10 = 2.03321e−011

29th surface

K = −7.30540e+000    A4 = 3.01647e−005    A6 = −2.05498e−007
A8 = 2.01927e−009    A10 = 2.15171e−011 various data
zoom ratio 19.97

| | | | | | | |
|---|---|---|---|---|---|---|
| focal length | 4.23 | 23.76 | 84.42 | 7.87 | 45.67 | 6.10 |
| F-number | 1.66 | 2.34 | 2.88 | 1.81 | 2.65 | 1.72 |
| field angle | 35.62 | 7.26 | 2.05 | 21.05 | 3.79 | 26.42 |

| unit mm | | | | | | |
|---|---|---|---|---|---|---|
| image height | 3.03 | 3.03 | 3.03 | 3.03 | 3.03 | 3.03 |
| overall length of lens | 153.18 | 153.18 | 153.18 | 153.18 | 153.18 | 153.18 |
| BF | 22.99 | 26.73 | 23.00 | 24.49 | 26.44 | 23.87 |
| d8 | 0.84 | 35.65 | 47.26 | 17.09 | 42.62 | 11.05 |
| d16 | 48.81 | 14.00 | 2.39 | 32.57 | 7.04 | 38.60 |
| d27 | 12.54 | 8.8 | 12.53 | 11.04 | 0.09 | 11.66 |
| d32 | 5.97 | 9.71 | 5.98 | 7.47 | 9.42 | 6.85 |

| zoom-lens-group data | | |
|---|---|---|
| group | first surface | focal length |
| 1 | 1 | 66.86 |
| 2 | 9 | −10.93 |
| 3 | 17 | 102.62 |
| 4 | 28 | 25.61 |
| 5 | 33 | ∞ |

[Numerical Embodiment 3]

| unit mm | | | | |
|---|---|---|---|---|
| surface data | | | | |
| surface number | r | d | nd | vd |
| 1 | 257.553 | 3.20 | 1.84666 | 23.9 |
| 2 | 75.460 | 1.80 | | |
| 3 | 98.141 | 7.87 | 1.59319 | 67.9 |
| 4 | −517.013 | 0.20 | | |
| 5 | 57.573 | 8.61 | 1.49700 | 81.5 |
| 6 | 509.292 | 0.20 | | |
| 7 | 53.115 | 4.55 | 1.83481 | 42.7 |
| 8 | 109.311 | (variable) | | |
| 9 | 61.257 | 1.15 | 2.00069 | 25.5 |
| 10 | 10.982 | 3.73 | | |
| 11 | 130.593 | 1.00 | 1.86400 | 40.6 |
| 12* | 30.364 | 2.63 | | |
| 13 | −25.150 | 0.85 | 1.77250 | 49.6 |
| 14 | 34.876 | 0.93 | | |
| 15 | 29.694 | 3.10 | 1.94595 | 18.0 |
| 16 | −57.648 | (variable) | | |
| 17 (stop) | ∞ | 2.73 | | |
| 18 | 90.811 | 0.80 | 1.88300 | 40.8 |
| 19 | 16.089 | 4.20 | 1.84666 | 23.9 |
| 20 | −25.134 | 0.14 | | |
| 21 | −22.223 | 0.80 | 2.00330 | 28.3 |
| 22 | 67.969 | 4.75 | | |
| 23* | 45.853 | 3.60 | 1.58313 | 59.4 |
| 24* | −26.791 | 0.20 | | |
| 25 | −256.997 | 2.00 | 1.48749 | 70.2 |
| 26 | −35.306 | 0.80 | 1.80518 | 25.4 |
| 27 | −289.904 | (variable) | | |
| 28* | 29.980 | 3.60 | 1.58313 | 59.4 |
| 29* | −50.804 | 0.20 | | |
| 30 | 92.305 | 0.90 | 1.92286 | 18.9 |
| 31 | 29.627 | 3.50 | 1.51633 | 64.1 |
| 32 | −38.608 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| image plane | ∞ | | | |

| unit mm | | |
|---|---|---|
| aspherical surface data | | |
| 12th surface | | |
| K = −1.00626e+001 | A4 = 5.60683e−005 | A6 = 5.44198e−008 |
| A8 = 1.70480e−009 | A10 = 1.47104e−012 | A12 = 8.12086e−014 |
| 23rd surface | | |
| K = 2.75906e+000 | | |
| A3 = 2.12208e−005 | A5 = −1.94863e−006 | A7 = −2.10172e−009 |
| A9 = 2.24105e−010 | A11 = −1.06411e−012 | |
| 24th surface | | |
| K = −5.16339e+000 | | |
| A3 = −5.55811e−006 | A5 = −4.10860e−006 | A7 = 2.88620e−008 |
| A9 = −5.54895e−011 | | |
| 28th surface | | |
| K = −1.49495e−001 | A4 = 2.25754e−005 | A6 = −2.26712e−007 |
| A8 = 2.91457e−009 | A10 = 2.14405e−011 | |
| 29th surface | | |
| K = −8.07409e+000 | A4 = 3.33734e−005 | A6 = −2.26516e−007 |
| A8 = 3.29579e−009 | A10 = 2.28830e−011 | |

| various data | | | | | | |
|---|---|---|---|---|---|---|
| zoom ratio 19.99 | | | | | | |
| focal length | 4.23 | 23.70 | 84.49 | 7.86 | 45.58 | 6.09 |
| F-number | 1.66 | 2.34 | 2.88 | 1.81 | 2.65 | 1.72 |
| field angle | 35.62 | 7.28 | 2.05 | 21.08 | 3.80 | 26.44 |
| image height | 3.03 | 3.03 | 3.03 | 3.03 | 3.03 | 3.03 |
| overall length of lens | 151.78 | 151.78 | 151.78 | 151.78 | 151.78 | 151.78 |
| BF | 23.03 | 26.93 | 23.18 | 24.59 | 26.68 | 23.94 |
| d8 | 0.86 | 34.22 | 45.34 | 16.43 | 40.90 | 10.65 |
| d16 | 47.18 | 13.82 | 2.70 | 31.61 | 7.15 | 37.39 |
| d27 | 12.67 | 8.76 | 12.52 | 11.11 | 9.02 | 11.75 |
| d32 | 6.01 | 9.91 | 6.16 | 7.57 | 9.66 | 6.92 |

| zoom-lens-group data | | |
|---|---|---|
| group | first surface | focal length |
| 1 | 1 | 64.59 |
| 2 | 9 | −10.40 |
| 3 | 17 | 96.54 |
| 4 | 28 | 25.80 |
| 5 | 33 | ∞ |

[Numerical Embodiment 4]

| unit mm | | | | |
|---|---|---|---|---|
| surface data | | | | |
| surface number | r | d | nd | vd |
| 1 | 291.874 | 3.20 | 1.84666 | 23.9 |
| 2 | 79.033 | 1.76 | | |
| 3 | 103.670 | 7.87 | 1.56907 | 71.3 |
| 4 | −412.090 | 0.20 | | |
| 5 | 60.396 | 8.61 | 1.48749 | 70.2 |
| 6 | 561.360 | 0.20 | | |
| 7 | 52.623 | 4.55 | 1.80400 | 46.6 |
| 8 | 114.825 | (variable) | | |
| 9 | 69.010 | 1.15 | 2.00330 | 28.3 |
| 10 | 10.931 | 3.98 | | |
| 11 | 183.808 | 1.00 | 1.68540 | 52.3 |
| 12* | 31.930 | 2.77 | | |
| 13 | −26.408 | 0.85 | 1.77250 | 49.6 |
| 14 | 32.238 | 1.04 | | |
| 15 | 30.422 | 3.10 | 1.92286 | 20.9 |
| 16 | −46.949 | (variable) | | |

-continued unit mm

| | | | | |
|---|---|---|---|---|
| 17 (stop) | ∞ | 2.73 | | |
| 18 | 91.135 | 0.80 | 1.88300 | 40.8 |
| 19 | 14.972 | 4.20 | 1.84666 | 23.9 |
| 20 | −24.965 | 0.13 | | |
| 21 | −22.170 | 0.80 | 2.00330 | 28.3 |
| 22 | 64.950 | 4.75 | | |
| 23* | 47.027 | 3.60 | 1.58313 | 59.4 |
| 24* | −26.551 | 0.20 | | |
| 25 | −272.373 | 2.00 | 1.48749 | 70.2 |
| 26 | −35.000 | 0.80 | 1.80518 | 25.4 |
| 27 | −244.903 | (variable) | | |
| 28* | 30.954 | 3.60 | 1.58313 | 59.4 |
| 29* | −48.512 | 0.20 | | |
| 30 | 90.035 | 0.90 | 1.92286 | 18.9 |
| 31 | 28.177 | 3.50 | 1.51633 | 64.1 |
| 32 | −37.122 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| image plane | ∞ | | | | aspherical surface data

12th surface

K = −1.26122e+001   A4 = 4.65958e−005   A6 = −1.16363e−007
A8 = 1.22752e−009   A10 = 3.93733e−012  A12 = 4.06006e−014

23rd surface

K = 3.81596e+000
A3 = 1.60154e−005   A5 = −1.98853e−006  A7 = −3.42790e−009
A9 = 1.79254e−010   A11 = −1.01638e−012

24th surface

K = −5.12512e+000
A3 = −9.64898e−006  A5 = −3.88306e−006  A7 = 2.43664e−008
A9 = −7.74172e−011

28th surface

K = 1.80601e−001
A4 = 2.10564e−005   A6 = −2.25859e−007
A8 = 2.18844e−009   A10 = 1.83482e−011

29th surface

K = −7.91050e+000
A4 = 3.14150e−005   A6 = −2.10237e−007
A8 = 2.36593e−009   A10 = 1.93470e−011 various data
zoom ratio 17.98

| | | | | | | |
|---|---|---|---|---|---|---|
| focal length | 4.23 | 22.74 | 75.98 | 7.78 | 42.57 | 6.06 |
| F-number | 1.66 | 2.34 | 2.88 | 1.81 | 2.65 | 1.72 |
| field angle | 35.63 | 7.59 | 2.28 | 21.28 | 4.07 | 26.57 |
| image height | 3.03 | 3.03 | 3.03 | 3.03 | 3.03 | 3.03 |
| overall length of lens | 152.90 | 152.90 | 152.90 | 152.90 | 152.90 | 152.90 |
| BF | 22.85 | 26.38 | 23.45 | 24.28 | 26.21 | 23.69 |
| d8 | 0.86 | 35.32 | 46.81 | 16.94 | 42.22 | 10.97 |
| d16 | 48.52 | 14.06 | 2.57 | 32.44 | 7.17 | 38.41 |
| d27 | 12.17 | 8.63 | 11.56 | 10.74 | 8.81 | 11.33 |
| d32 | 5.83 | 9.37 | 6.44 | 7.26 | 9.19 | 6.67 | zoom-lens-group data

| group | first surface | focal length |
|---|---|---|
| 1 | 1 | 66.56 |
| 2 | 9 | −11.13 |
| 3 | 17 | 98.38 |
| 4 | 28 | 25.80 |
| 5 | 33 | ∞ |

[Numerical Embodiment 5]

unit mm surface data

| surface number | r | d | nd | vd |
|---|---|---|---|---|
| 1 | 279.602 | 3.20 | 1.84666 | 23.9 |
| 2 | 78.619 | 1.80 | | |
| 3 | 103.422 | 7.85 | 1.59319 | 67.9 |
| 4 | −481.133 | 0.20 | | |
| 5 | 58.971 | 8.60 | 1.49700 | 81.5 |
| 6 | 500.860 | 0.20 | | |
| 7 | 54.232 | 4.55 | 1.83481 | 42.7 |
| 8 | 110.949 | (variable) | | |
| 9 | 68.002 | 1.15 | 2.00069 | 25.5 |
| 10 | 10.980 | 3.85 | | |
| 11 | 125.053 | 1.00 | 1.85135 | 40.1 |
| 12* | 29.719 | 2.67 | | |
| 13 | −26.734 | 0.85 | 1.77250 | 49.6 |
| 14 | 41.825 | 0.84 | | |
| 15 | 31.046 | 3.10 | 1.94595 | 18.0 |
| 16 | −54.861 | (variable) | | |
| 17 (stop) | ∞ | 2.73 | | |
| 18 | 89.460 | 0.80 | 1.88300 | 40.8 |
| 19 | 15.461 | 4.20 | 1.84666 | 23.9 |
| 20 | −25.269 | 0.14 | | |
| 21 | −22.185 | 0.80 | 2.00330 | 28.3 |
| 22 | 66.393 | 4.75 | | |
| 23* | 46.529 | 3.60 | 1.58313 | 59.4 |
| 24* | −26.933 | 0.20 | | |
| 25 | −203.745 | 2.00 | 1.48749 | 70.2 |
| 26 | −34.732 | 0.80 | 1.80518 | 25.4 |
| 27 | −229.502 | (variable) | | |
| 28* | 30.580 | 3.60 | 1.58313 | 59.4 |
| 29* | −48.480 | 0.20 | | |
| 30 | 90.028 | 0.90 | 1.92286 | 18.9 |
| 31 | 28.776 | 3.50 | 1.51633 | 64.1 |
| 32 | −37.052 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| image plane | ∞ | | | | aspherical surface data

12th surface

K = −2.09315e+001   A4 = 1.06195e−004   A6 = −8.10904e−007
A8 = 7.60130e−009   A10 = 3.21857e−012  A12 = −2.83689e−013

23rd surface

K = 2.10328e+000
A3 = 2.06948e−005   A5 = −1.91231e−006  A7 = −8.07340e−010
A9 = 1.89205e−010   A11 = −1.20487e−012

24th surface

K = −4.75167e+000
A3 = 8.42353e−007   A5 = −3.97374e−006  A7 = 2.93971e−008
A9 = −1.04352e−010

28th surface

K = 9.42037e−002
A4 = 1.84021e−005   A6 = −2.55342e−007
A8 = 3.04586e−009   A10 = 1.12969e−011

29th surface

K = −6.51874e+000
A4 = 3.09390e−005   A6 = −2.38880e−007
A8 = 3.19270e−009   A10 = 1.17773e−011 various data
zoom ratio 17.91

| | | | | | | |
|---|---|---|---|---|---|---|
| focal length | 4.23 | 22.82 | 75.72 | 7.78 | 42.69 | 6.06 |
| F-number | 1.66 | 2.34 | 2.88 | 1.81 | 2.65 | 1.72 |
| field angle | 35.63 | 7.56 | 2.29 | 21.26 | 4.06 | 26.55 |

-continued unit mm

| | | | | | | |
|---|---|---|---|---|---|---|
| image height | 3.03 | 3.03 | 3.03 | 3.03 | 3.03 | 3.03 |
| overall length of lens | 152.79 | 152.79 | 152.79 | 152.79 | 152.79 | 152.79 |
| BF | 22.93 | 26.58 | 23.76 | 24.39 | 26.46 | 23.79 |
| d8 | 0.86 | 35.06 | 46.46 | 16.82 | 41.90 | 10.89 |
| d16 | 48.35 | 14.15 | 2.75 | 32.39 | 7.31 | 38.31 |
| d27 | 12.58 | 8.93 | 11.75 | 11.12 | 9.05 | 11.73 |
| d32 | 5.91 | 9.57 | 6.75 | 7.37 | 9.45 | 6.77 | zoom-lens-group data

| group | first surface | focal length |
|---|---|---|
| 1 | 1 | 66.58 |
| 2 | 9 | −10.95 |
| 3 | 17 | 103.50 |
| 4 | 28 | 25.47 |
| 5 | 33 | ∞ |

[Numerical Embodiment 6]

unit mm surface data

| surface number | r | d | nd | vd |
|---|---|---|---|---|
| 1 | 307.127 | 3.20 | 1.84666 | 23.9 |
| 2 | 80.730 | 1.62 | | |
| 3 | 103.464 | 7.87 | 1.59319 | 67.9 |
| 4 | −418.544 | 0.20 | | |
| 5 | 59.873 | 8.61 | 1.49700 | 81.5 |
| 6 | 461.724 | 0.20 | | |
| 7 | 53.960 | 4.55 | 1.83481 | 42.7 |
| 8 | 108.675 | (variable) | | |
| 9 | 67.704 | 1.15 | 2.00069 | 25.5 |
| 10 | 10.773 | 3.90 | | |
| 11 | 118.914 | 1.00 | 1.86400 | 40.6 |
| 12* | 30.368 | 2.35 | | |
| 13 | −29.183 | 0.85 | 1.77250 | 49.6 |
| 14 | 34.470 | 0.82 | | |
| 15 | 28.050 | 3.10 | 1.94595 | 18.0 |
| 16 | −59.267 | (variable) | | |
| 17 (stop) | ∞ | 2.73 | | |
| 18 | 90.514 | 0.80 | 1.88300 | 40.8 |
| 19 | 19.387 | 4.20 | 1.84666 | 23.9 |
| 20 | −15.123 | 0.80 | 2.00330 | 28.3 |
| 21 | 66.532 | 4.75 | | |
| 22* | 46.280 | 3.60 | 1.58313 | 59.4 |
| 23* | −26.723 | 0.20 | | |
| 24 | −196.513 | 2.00 | 1.48749 | 70.2 |
| 25 | −34.768 | 0.80 | 1.80518 | 25.4 |
| 26 | −243.969 | (variable) | | |
| 27* | 30.593 | 3.60 | 1.58313 | 59.4 |
| 28* | −49.603 | 0.20 | | |
| 29 | 90.903 | 0.90 | 1.92286 | 18.9 |
| 30 | 28.594 | 3.50 | 1.51633 | 64.1 |
| 31 | −37.301 | (variable) | | |
| 32 | ∞ | 0.80 | 1.52420 | 60.0 |
| 33 | ∞ | 2.43 | 1.54400 | 70.0 |
| 34 | ∞ | 1.50 | | |
| 35 | ∞ | 20.00 | 1.58913 | 61.1 |
| 36 | ∞ | 0.50 | 1.49831 | 65.1 |
| 37 | ∞ | 0.5 | | |
| image plane | ∞ | | | | aspherical surface data

12th surface

K = −1.17018e+001  A4 = 5.69177e−005  A6 = −1.25418e−007
A8 = 1.94051e−009  A10 = −4.76668e−012  A12 = 7.87486e−014

-continued unit mm

22nd surface

K = 4.27644e+000
A3 = 2.58441e−005  A5 = −2.30847e−006  A7 = −2.27160e−009
A9 = 1.69565e−010  A11 = −1.00008e−012

23rd surface

K = −5.05413e+000
A3 = 8.16476e−006  A5 = −3.93873e−006  A7 = 2.47640e−008
A9 = 8.25429e−011

27th surface

K = −1.66915e−001  A4 = 2.04977e−005  A6 = −2.14663e−007
A8 = 1.90469e−009  A10 = 2.10665e−011

28th surface

K = −7.57115e+000  A4 = 3.00478e−005  A6 = −2.02311e−007
A8 = 2.17514e−009  A10 = 2.12527e−011 various data
zoom ratio 19.98

| | | | | | | |
|---|---|---|---|---|---|---|
| focal length | 4.23 | 23.73 | 84.44 | 7.86 | 45.63 | 6.09 |
| F-number | 1.66 | 2.34 | 2.88 | 1.81 | 2.65 | 1.72 |
| field angle | 35.62 | 7.28 | 2.05 | 21.07 | 3.80 | 26.43 |
| image height | 3.03 | 3.03 | 3.03 | 3.03 | 3.03 | 3.03 |
| overall length of lens | 152.92 | 152.92 | 152.92 | 152.92 | 152.92 | 152.92 |
| BF | 22.51 | 26.31 | 22.69 | 24.03 | 26.07 | 23.40 |
| d8 | 0.89 | 35.83 | 47.47 | 17.19 | 42.81 | 11.14 |
| d16 | 49.06 | 14.12 | 2.48 | 32.76 | 7.14 | 38.81 |
| d26 | 12.95 | 9.15 | 12.77 | 11.43 | 9.39 | 12.06 |
| d31 | 5.49 | 9.29 | 5.67 | 9.05 | 6.38 | | zoom-lens-group data

| group | first surface | focal length |
|---|---|---|
| 1 | 1 | 67.08 |
| 2 | 9 | −10.88 |
| 3 | 17 | 91.54 |
| 4 | 27 | 25.80 |
| 5 | 32 | ∞ |

[Numerical Embodiment 7]

unit mm surface data

| surface number | r | d | nd | vd |
|---|---|---|---|---|
| 1 | 226.284 | 3.00 | 1.84666 | 23.9 |
| 2 | 71.021 | 1.34 | | |
| 3 | 89.027 | 7.87 | 1.59319 | 67.9 |
| 4 | −568.836 | 0.20 | | |
| 5 | 53.728 | 8.61 | 1.49700 | 81.5 |
| 6 | 579.078 | 0.20 | | |
| 7 | 49.831 | 4.55 | 1.83481 | 42.7 |
| 8 | 97.586 | (variable) | | |
| 9 | 137.274 | 1.15 | 2.00069 | 25.5 |
| 10 | 11.435 | 3.72 | | |
| 11 | 105.887 | 1.00 | 1.86400 | 40.6 |
| 12* | 24.086 | 2.68 | | |
| 13 | −36.643 | 0.85 | 1.77250 | 49.6 |
| 14 | 34.414 | 1.11 | | |
| 15 | 29.286 | 3.10 | 1.94595 | 18.0 |
| 16 | −61.107 | (variable) | | |
| 17 (stop) | ∞ | 2.73 | | |
| 18 | 99.257 | 0.80 | 1.88300 | 40.8 |
| 19 | 14.675 | 4.20 | 1.84666 | 23.9 |
| 20 | −24.423 | 0.12 | | |
| 21 | −21.964 | 0.80 | 2.00330 | 28.3 |
| 22 | 63.452 | 4.75 | | |

-continued unit mm

| surface | r | d | nd | vd |
|---|---|---|---|---|
| 23* | 47.331 | 3.60 | 1.58313 | 59.4 |
| 24* | −25.969 | 0.20 | | |
| 25 | −150.820 | 2.00 | 1.48749 | 70.2 |
| 26 | −31.447 | 0.80 | 1.80518 | 25.4 |
| 27 | −151.578 | (variable) | | |
| 28* | 31.694 | 3.60 | 1.58313 | 59.4 |
| 29* | −44.157 | 0.20 | | |
| 30 | 81.993 | 0.90 | 1.92286 | 18.9 |
| 31 | 27.616 | 3.50 | 1.51633 | 64.1 |
| 32 | −38.896 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | (variable) | | |
| image plane | ∞ | | | | aspherical surface data

12th surface

K = −6.32778e+000  A4 = 5.08166e−005  A6 = −1.39488e−007
A8 = 1.00493e−009  A10 = 6.98611e−012  A12 = −7.19687e−014

23rd surface

K = 4.97293e+000
A3 = 1.91897e−005  A5 = −2.33419e−006  A7 = 4.62859e−009
A9 = 1.96521e−010  A11 = −1.27217e−012

24th surface

K = −4.13196e+000
A3 = −7.07759e−006  A5 = −3.18077e−006  A7 = 1.82115e−008
A9 = 1.44327e−013

28th surface

K = −2.25949e−001  A4 = 5.64041e−006  A6 = −1.36625e−007
A8 = 7.85093e−010  A10 = 3.21153e−012

29th surface

K = −8.72366e+000  A4 = 1.22591e−005  A6 = −1.41122e−007
A8 = 1.11956e−009  A10 = 1.31947e−012 various data
zoom ratio 18.00

| | | | |
|---|---|---|---|
| focal length | 4.10 | 17.31 | 73.79 |
| F-number | 1.66 | 2.34 | 2.88 |
| field angle | 36.46 | 9.92 | 2.35 |
| image height | 3.03 | 3.03 | 3.03 |
| overall length of lens | 155.62 | 147.37 | 150.40 |
| BF | 22.74 | 26.41 | 22.87 |
| d8 | 1.08 | 27.13 | 41.04 |
| d16 | 48.80 | 14.49 | 3.62 |
| d27 | 15.43 | 11.77 | 15.31 |
| d32 | 5.73 | 9.39 | 5.85 |
| d38 | 0.50 | 0.50 | 0.50 | zoom-lens-group data

| group | first surface | focal length |
|---|---|---|
| 1 | 1 | 60.42 |
| 2 | 9 | −10.53 |
| 3 | 17 | 106.85 |
| 4 | 28 | 25.28 |
| 5 | 33 | ∞ |

[Numerical Embodiment 8]

unit mm surface data

| surface number | r | d | nd | vd |
|---|---|---|---|---|
| 1 | 219.039 | 3.00 | 1.84666 | 23.9 |
| 2 | 71.465 | 1.24 | | |
| 3 | 87.811 | 7.87 | 1.59319 | 67.9 |
| 4 | −605.893 | 0.20 | | |
| 5 | 53.996 | 8.61 | 1.49700 | 81.5 |
| 6 | 533.542 | 0.20 | | |
| 7 | 50.493 | 4.55 | 1.83481 | 42.7 |
| 8 | 96.260 | (variable) | | |
| 9 | 141.304 | 1.15 | 2.00069 | 25.5 |
| 10 | 11.445 | 3.76 | | |
| 11 | 119.510 | 1.00 | 1.86400 | 40.6 |
| 12* | 24.011 | 2.71 | | |
| 13 | −36.665 | 0.85 | 1.77250 | 49.6 |
| 14 | 36.883 | 1.02 | | |
| 15 | 29.528 | 3.10 | 1.94595 | 18.0 |
| 16 | −60.674 | (variable) | | |
| 17 (stop) | ∞ | 2.73 | | |
| 18 | 100.310 | 0.80 | 1.88300 | 40.8 |
| 19 | 14.643 | 4.20 | 1.84666 | 23.9 |
| 20 | −24.417 | 0.12 | | |
| 21 | −21.969 | 0.80 | 2.00330 | 28.3 |
| 22 | 62.953 | 4.75 | | |
| 23* | 47.261 | 3.60 | 1.58313 | 59.4 |
| 24* | −26.076 | 0.20 | | |
| 25 | −153.682 | 2.00 | 1.48749 | 70.2 |
| 26 | −31.652 | 0.80 | 1.80518 | 25.4 |
| 27 | −151.624 | (variable) | | |
| 28* | 31.731 | 3.60 | 1.58313 | 59.4 |
| 29* | −44.433 | 0.20 | | |
| 30 | 82.343 | 0.90 | 1.92286 | 18.9 |
| 31 | 27.717 | 3.50 | 1.51633 | 64.1 |
| 32 | −38.886 | (variable) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | (variable) | | |
| image plane | ∞ | | | | aspherical surface data

12th surface

K = −6.23058e+000  A4 = 5.19381e−005  A6 = −1.26459e−007
A8 = 9.77636e−010  A10 = 6.26993e−012  A12 = −6.55827e−014

23rd surface

K = 4.17514e+000
A3 = 2.14981e−005  A5 = −2.24947e−006  A7 = 4.43910e−009
A9 = 1.97074e−010  A11 = −1.24453e−012

24th surface

K = −4.08456e+000
A3 = −5.05858e−006  A5 = −3.17133e−006  A7 = 1.83882e−008
A9 = −2.77282e−013

28th surface

K = −1.69139e−001  A4 = 5.39779e−006  A6 = −1.37340e−007
A8 = 7.97250e−010  A10 = 4.40405e−012

29th surface

K = −8.67804e+000  A4 = 1.22870e−005  A6 = −1.40391e−007
A8 = 1.09961e−009  A10 = 2.79043e−012 various data
zoom ration 19.99

| | | | |
|---|---|---|---|
| focal length | 4.13 | 17.19 | 82.63 |
| F-number | 1.66 | 2.34 | 2.88 |
| field angle | 36.24 | 10.00 | 2.10 |

-continued

| unit mm | | | |
|---|---|---|---|
| image height | 3.03 | 3.03 | 3.03 |
| overall length of lens | 155.35 | 147.44 | 150.69 |
| BF | 22.89 | 26.59 | 22.25 |
| d8 | 1.21 | 27.33 | 42.23 |
| d16 | 48.58 | 14.55 | 2.90 |
| d27 | 15.21 | 11.51 | 15.85 |
| d32 | 5.87 | 9.57 | 5.24 |
| d38 | 0.50 | 0.50 | 0.50 |

| zoom-lens-group data | | |
|---|---|---|
| group | first surface | focal length |
| 1 | 1 | 61.43 |
| 2 | 9 | −10.53 |
| 3 | 17 | 108.23 |
| 4 | 28 | 25.34 |
| 5 | 33 | ∞ |

TABLE 1

| Conditional Expression | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| (1) $|f2|/(fw * ft)^{(1/2)}$ | 0.64 | 0.58 | 0.55 | 0.62 | 0.61 | 0.58 | 0.61 | 0.57 |
| (2) N2N | 2.0007 | 2.0007 | 2.0007 | 2.0033 | 2.0007 | 2.0007 | 2.0007 | 2.0007 |
| (3) V2P | 17.98 | 17.98 | 17.98 | 20.88 | 17.98 | 17.98 | 17.98 | 17.98 |
| (4) f1/ft | 0.91 | 0.79 | 0.76 | 0.88 | 0.88 | 0.79 | 0.82 | 0.74 |
| (5) V1A | 67.90 | 67.90 | 67.90 | 71.30 | 67.90 | 67.90 | 67.90 | 67.90 |
| (6) V1B | 81.54 | 81.54 | 81.54 | 70.23 | 81.54 | 81.54 | 81.54 | 81.54 |

Referring to FIG. 17, an embodiment of a video camera as a representation of an image pickup apparatus in which the zoom lens of the present invention is used as the imaging optical system will be described. FIG. 17 shows a video camera body 10; an imaging optical system 11 composed of the zoom lens of the present invention; a solid-state image-pickup element (photoelectric conversion element) 12, which is a CCD sensor or a CMOS sensor that receives an object image formed by the imaging optical system 11; a memory 13 that stores information of the object image having gone through photoelectric conversion by the image-pickup element 12; and a viewfinder 14 through which the object image shown by a display (not shown) is observed. By using the zoom lens of the present invention in an image pickup apparatus such as a video camera, a compact image pickup apparatus having high optical performance can be realized. Note that the zoom lens of the present invention can also be used in digital still cameras.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-237482 filed Oct. 14, 2009, which is hereby incorporated by reference herein in its entirety.

What is claimed is:

1. A zoom lens comprising, in order from the object side to the image side:
a first lens group having positive refractive power, the first lens group consisting of, in order from the object side to the image side, a negative lens, a biconvex positive lens, a positive lens having a convex surface on the object side, and a meniscus positive lens having a convex surface on the object side;
a second lens group having negative refractive power, the second lens group consisting of, in order from the object side to the image side, three negative lenses and one positive lens;
a third lens group having positive refractive power, the third lens group including a lens having aspherical surfaces on both sides; and
a fourth lens group having positive refractive power, the fourth lens group consisting of, in order from the object side to the image side, a biconvex positive lens having aspherical surfaces on both sides and a cemented lens composed of a meniscus negative lens having a concave surface on the image side and a positive lens having a convex surface on the object side,
wherein at least the second and fourth lens groups are moved along the optical axis during zooming.

2. The zoom lens according to claim 1, wherein the following conditions are satisfied $85<N2N$ $v2P<22$ where N2N is the refractive index of the material of one negative lens in the second lens group, and v2P is the Abbe number of the material of one positive lens in the second lens group.

3. The zoom lens according to claim 1, wherein the first lens group satisfies the following conditions:

$0.7<f1/ft<1.0$ $65<V1A<75$ $70<V1B$ where f1 is the focal length of the first lens group, ft is the focal length of the entire optical system at the telephoto end, V1A is the Abbe number of the material of one positive lens in the first lens group, and V1B is the Abbe number of the material of another positive lens in the first lens group.

4. The zoom lens according to claim 1,
wherein some or all of the lenses in the third lens group are moved so as to have a component perpendicular to the optical axis direction, thereby shifting an image-forming position.

5. An image pickup apparatus, comprising:
a zoom lens; and
an image-pickup element that receives an image formed by the zoom lens, the zoom lens including:
a first lens group having positive refractive power, the first lens group consisting of, in order from the object side to the image side, a negative lens, a biconvex positive lens, a positive lens having a convex surface on the object side, and a meniscus positive lens having a convex surface on the object side;
a second lens group having negative refractive power, the second lens group consisting of, in order from the object side to the image side, three negative lenses and one positive lens;
a third lens group having positive refractive power, the third lens group including a lens having aspherical surfaces on both sides; and
a forth lens group having positive refractive power, the fourth lens group consisting of, in order from the object side to the image side, a biconvex positive lens having aspherical surfaces on both sides and a cemented lens composed of a meniscus negative lens having a concave surface on the image side and a positive lens having a convex surface on the object side,
wherein at least the second and fourth lens groups are moved along the optical axis during zooming.

* * * * *